US008277222B2

(12) United States Patent
Shepherd

(10) Patent No.: US 8,277,222 B2
(45) Date of Patent: Oct. 2, 2012

(54) METHOD AND DEVICE FOR DIAGNOSING AND APPLYING TREATMENT FOR THE EMOTIONAL, PHYSICAL, AND COGNITIVE DEVELOPMENT OF A CHILD FOR A MULTICULTURAL SOCIETY

(76) Inventor: Kimberly Ann Shepherd, Laramie, WY (US)

( * ) Notice: Subject to any disclaimer, the term of this patent is extended or adjusted under 35 U.S.C. 154(b) by 773 days.

(21) Appl. No.: 12/313,971

(22) Filed: Nov. 26, 2008

(65) Prior Publication Data

US 2009/0191525 A1     Jul. 30, 2009

Related U.S. Application Data

(60) Provisional application No. 61/004,671, filed on Nov. 28, 2007.

(51) Int. Cl.
G09B 19/00         (2006.01)
(52) U.S. Cl. ........................................................ 434/236
(58) Field of Classification Search .................. 434/236, 434/238; 446/97–100, 321, 327, 328
See application file for complete search history.

(56) References Cited

U.S. PATENT DOCUMENTS

| | | | | |
|---|---|---|---|---|
| 2,717,799 A * | 9/1955 | Jones | ............................ | 294/25 |
| 3,811,220 A * | 5/1974 | Glass et al. | ................... | 446/321 |
| 4,122,628 A * | 10/1978 | Crowell et al. | ............... | 446/100 |
| 4,341,521 A * | 7/1982 | Solomon | ........................ | 434/236 |
| 4,573,927 A * | 3/1986 | Newman | ........................ | 434/236 |
| 4,710,145 A * | 12/1987 | Hall Vandis | .................. | 446/100 |
| 4,762,494 A * | 8/1988 | Woods | ........................... | 434/236 |
| 4,917,607 A * | 4/1990 | Van Hoose | ..................... | 434/236 |
| 5,092,778 A * | 3/1992 | Shaver et al. | ................. | 434/236 |
| 5,848,928 A * | 12/1998 | Wong | ............................ | 446/329 |
| 6,155,836 A * | 12/2000 | Hancock | ....................... | 434/188 |
| 6,422,871 B2 * | 7/2002 | Shepherd | ...................... | 434/236 |
| 6,726,068 B2 * | 4/2004 | Miller | ........................... | 223/101 |
| 6,945,841 B2 * | 9/2005 | Becker et al. | ................. | 446/100 |
| 6,951,464 B2 * | 10/2005 | Cubeta et al. | ................ | 434/159 |
| 7,029,361 B2 * | 4/2006 | Seibert et al. | ................ | 446/327 |
| 7,182,601 B2 * | 2/2007 | Donnan | ........................ | 434/236 |
| 7,722,357 B2 * | 5/2010 | Payette-Hebert et al. | .... | 434/236 |
| 7,744,137 B2 * | 6/2010 | Mazyck | ........................... | 294/25 |
| 7,843,429 B2 | 11/2010 | Pryor | | |
| 8,062,087 B1 * | 11/2011 | Davis et al. | ..................... | 446/26 |
| 2005/0208870 A1 * | 9/2005 | Collard et al. | ................ | 446/327 |
| 2005/0287911 A1 * | 12/2005 | Schulze | .......................... | 446/297 |
| 2007/0015434 A1 * | 1/2007 | Preece | ........................... | 446/328 |
| 2011/0059798 A1 | 3/2011 | Pryor | | |

* cited by examiner

*Primary Examiner* — Kurt Fernstrom
(74) *Attorney, Agent, or Firm* — Santangelo Law Offices, P.C.

(57) ABSTRACT

The present invention relates to a method and device for diagnosing and applying treatment for the emotional, physical, spiritual, and cognitive development of a child by presenting illustrations having social and emotional attributes so the emotional, physical, spiritual, and cognitive levels of the child can be further developed in our multicultural society. This is a pyramid with hand/finger puppets, emotional faces, intellectual, educational and physical attributes.

15 Claims, 27 Drawing Sheets

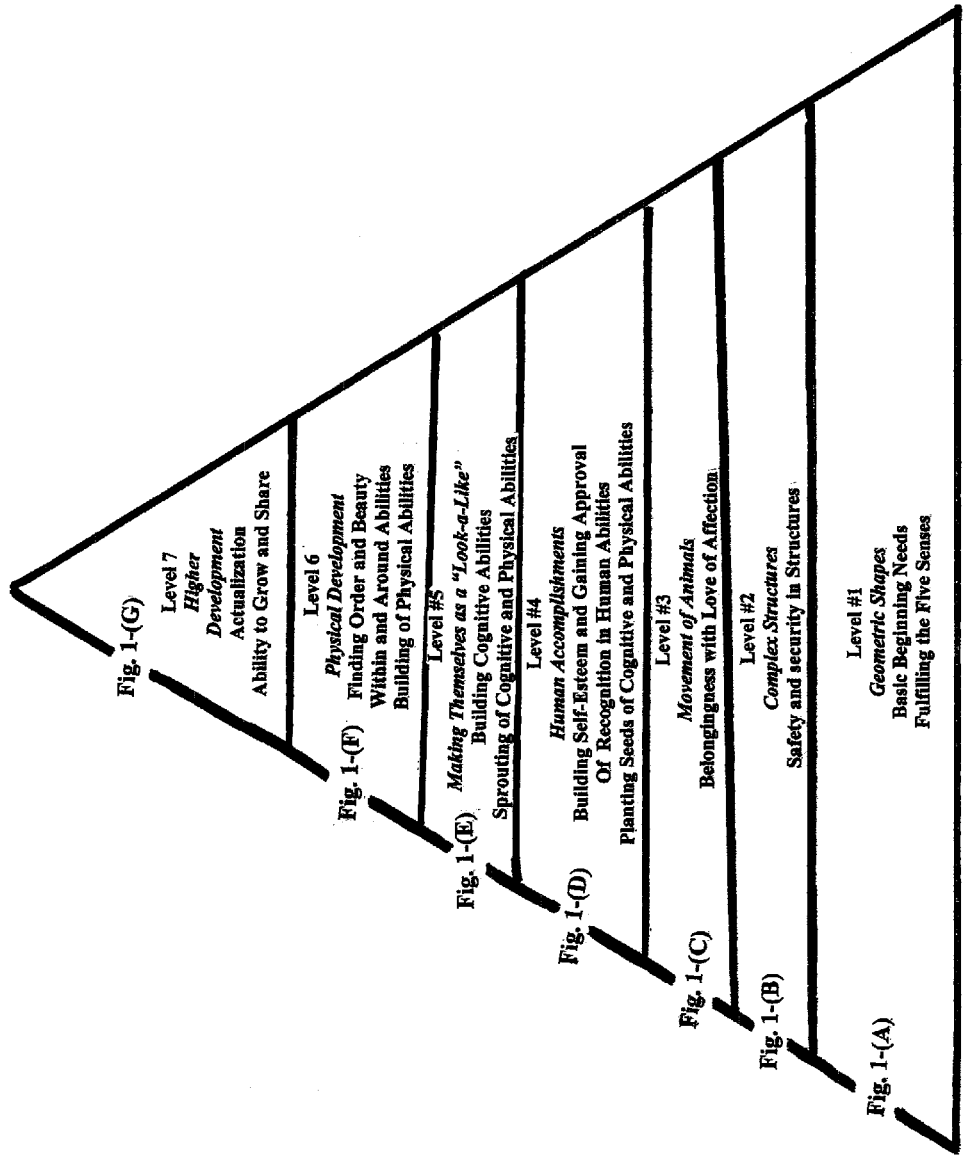

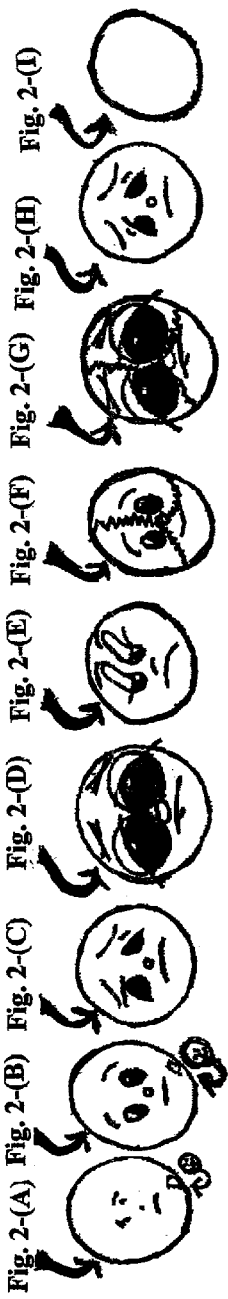

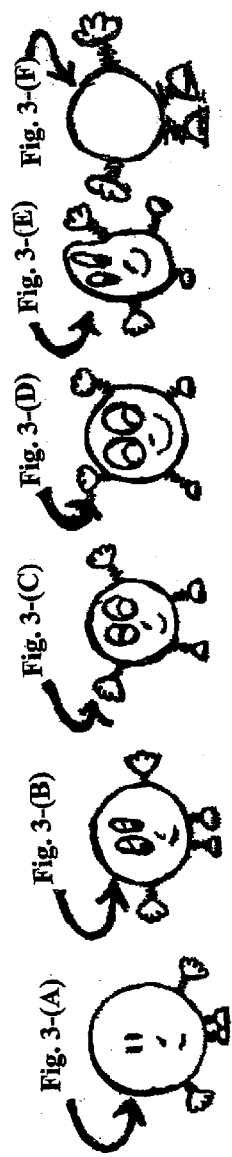

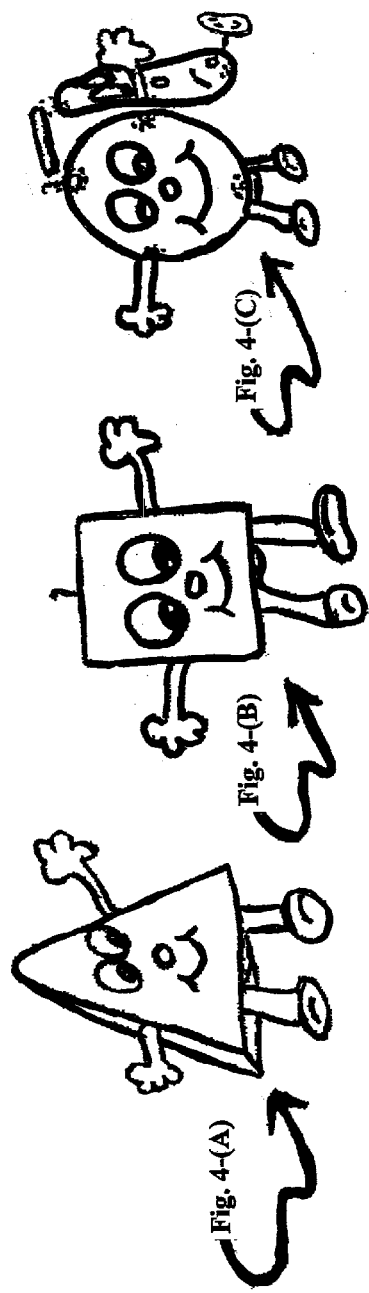

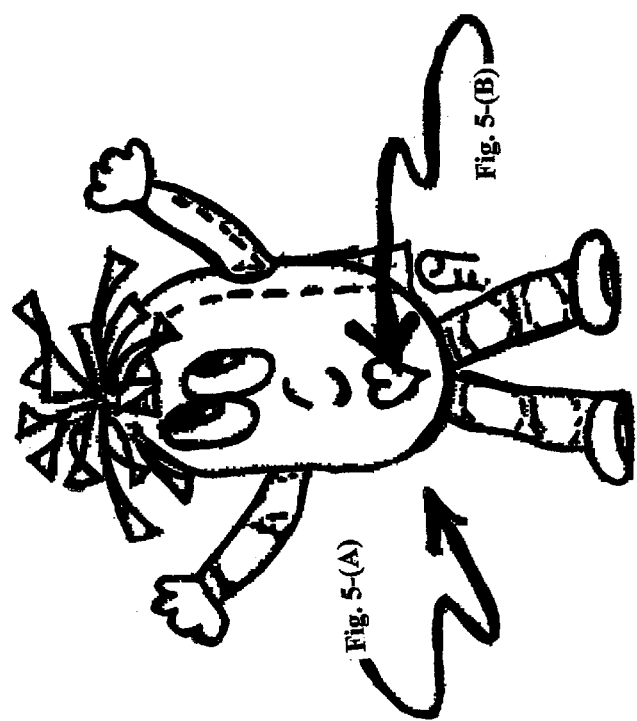

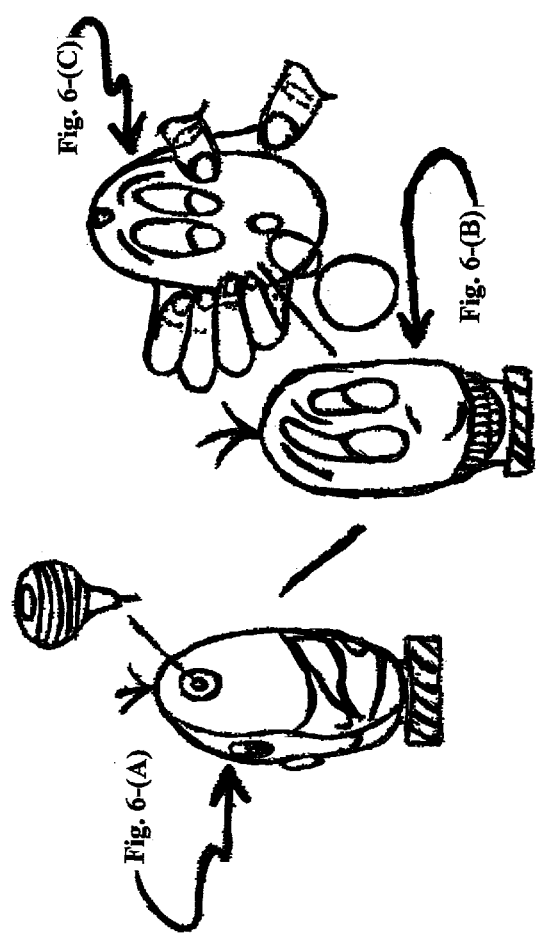

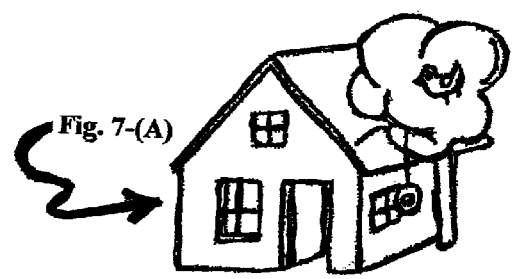

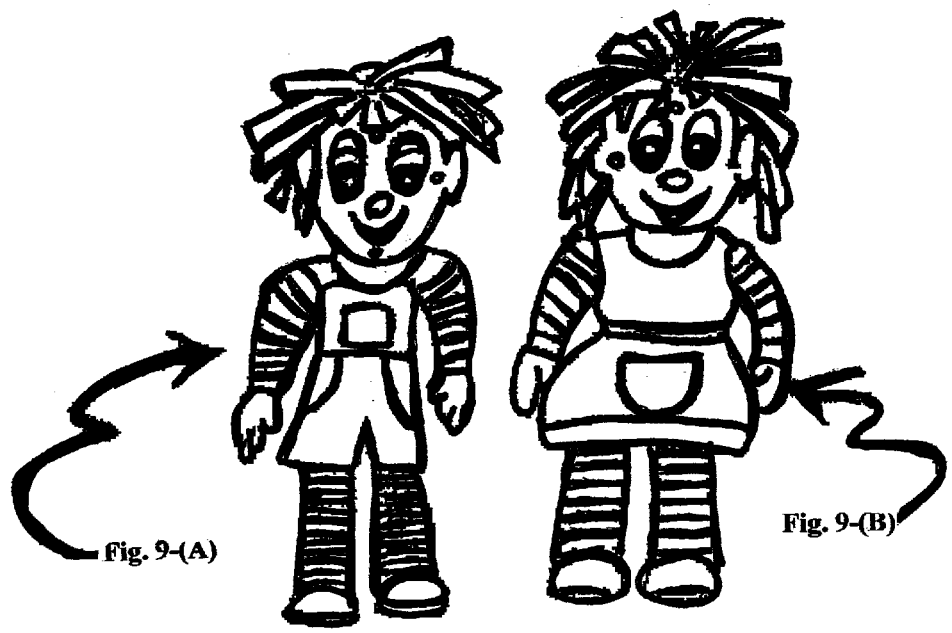
Fig. 9-(A) Fig. 9-(B)
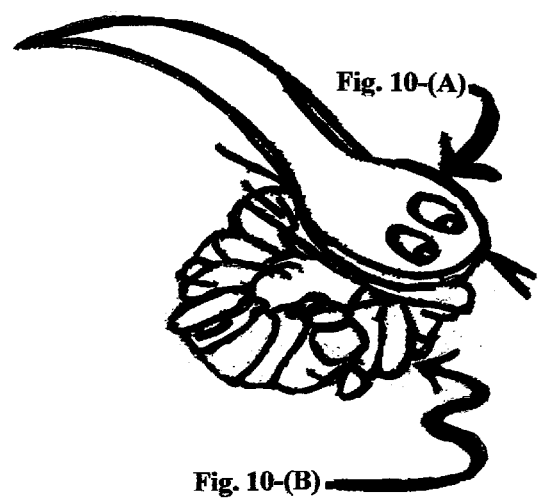
Fig. 10-(A) Fig. 10-(B)

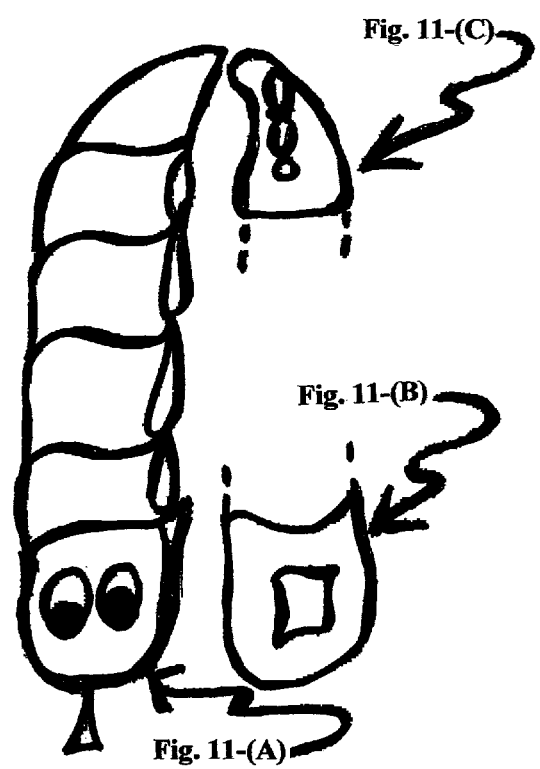

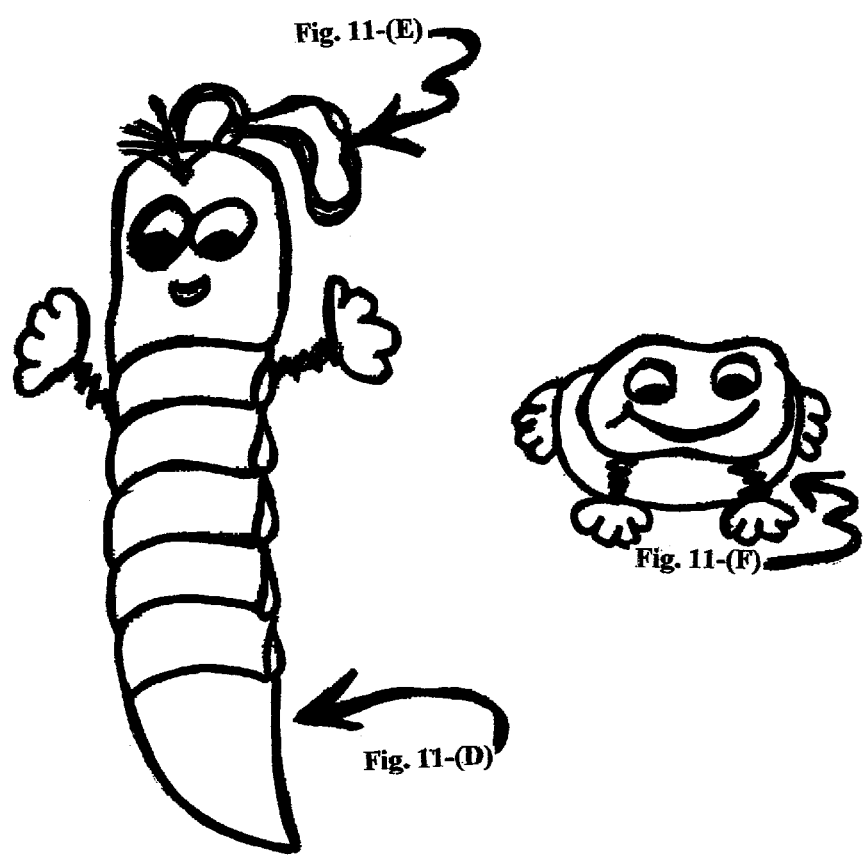

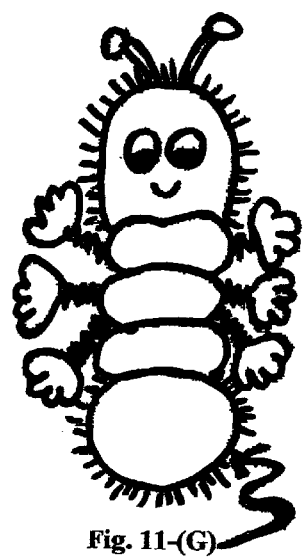
Fig. 11-(G)
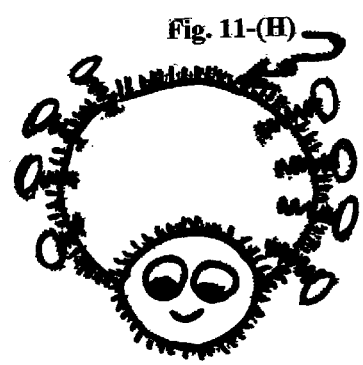
Fig. 11-(H)

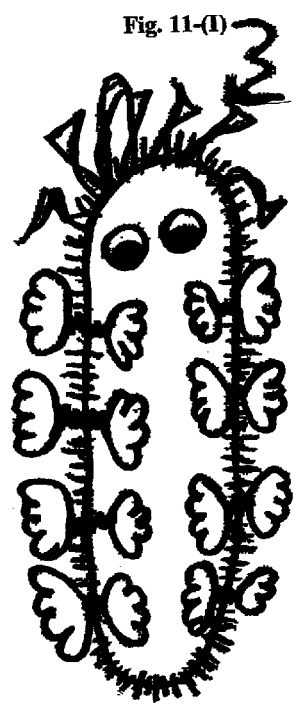
Fig. 11-(I)

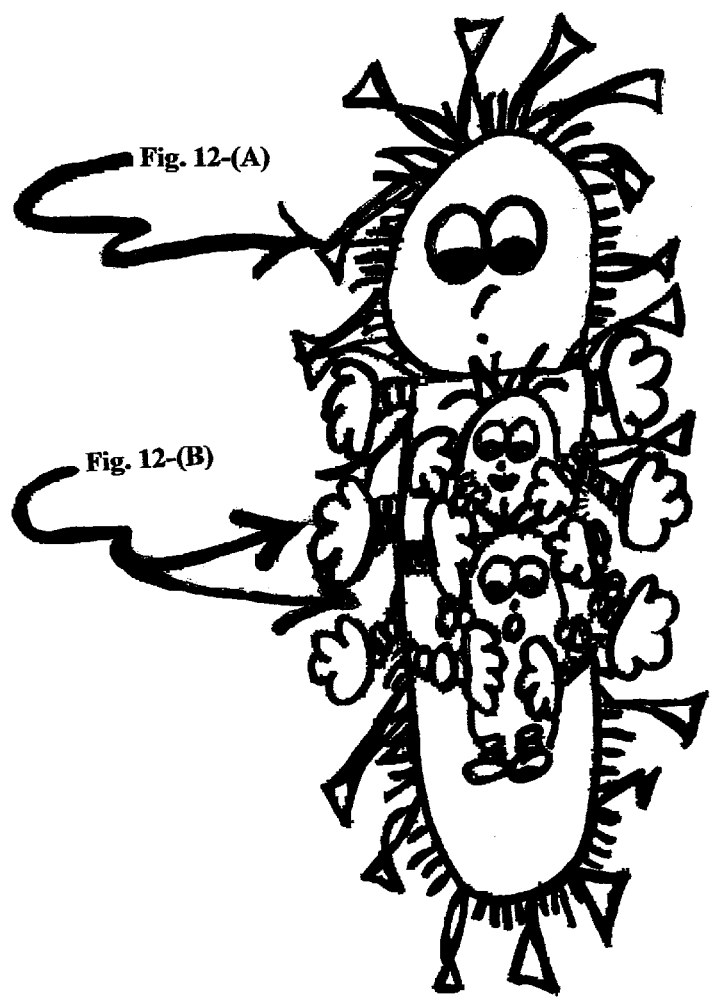

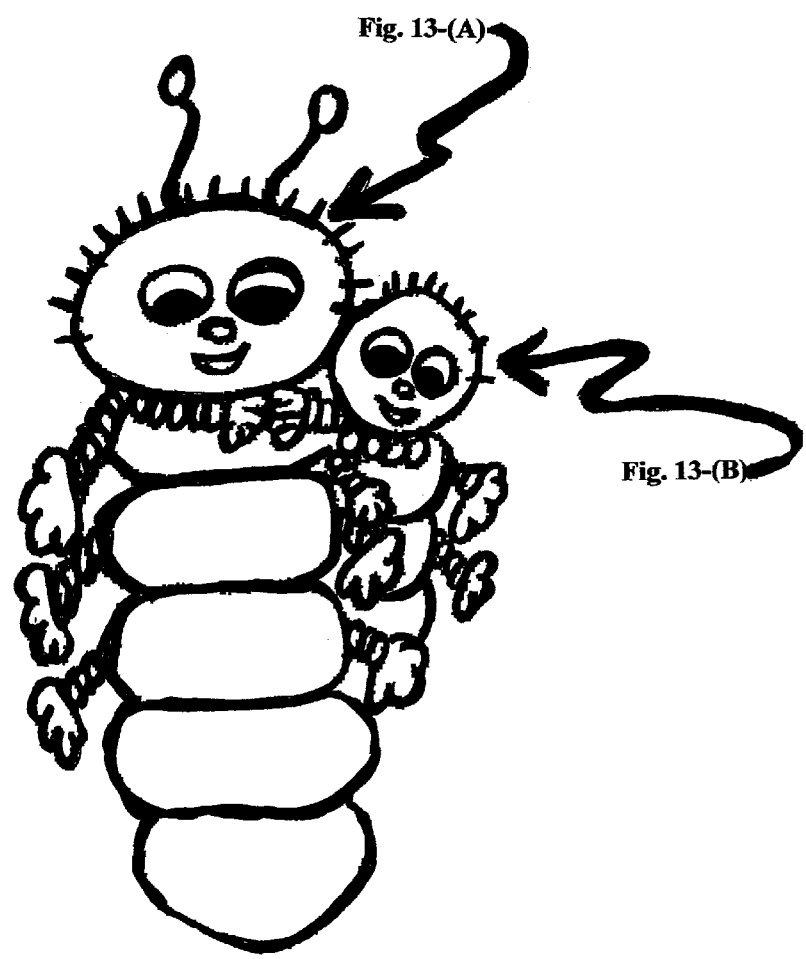

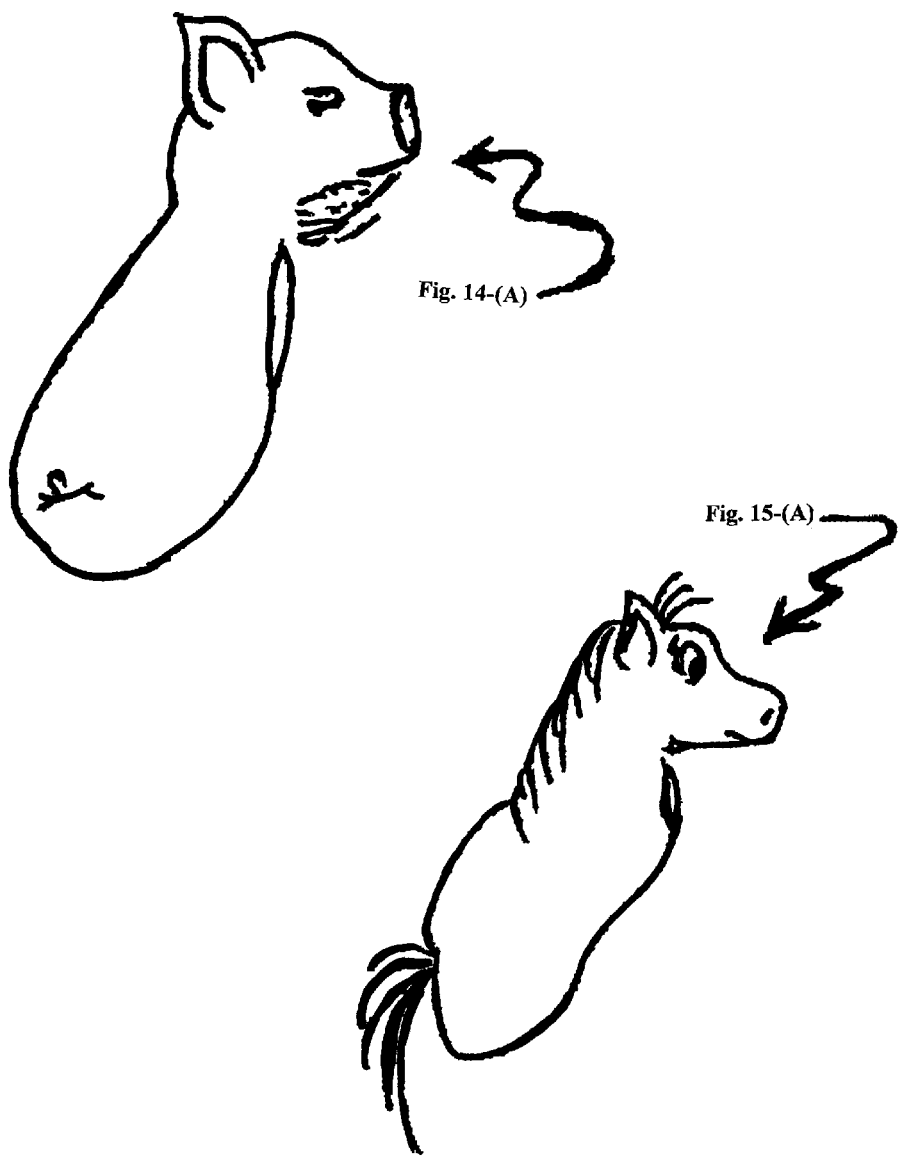
Fig. 14-(A)
Fig. 15-(A)

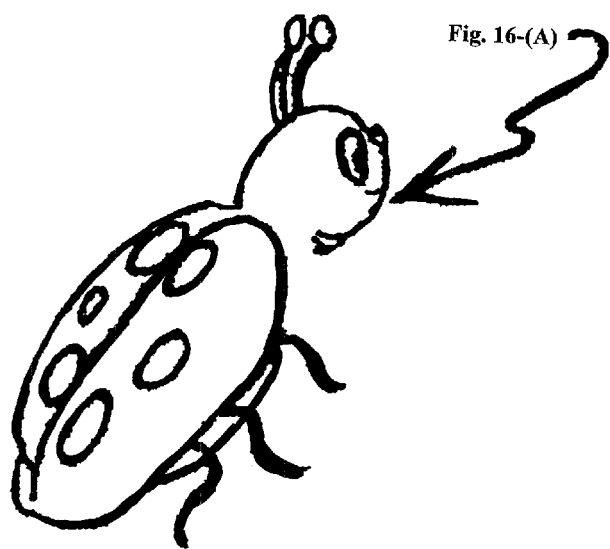
Fig. 16-(A)
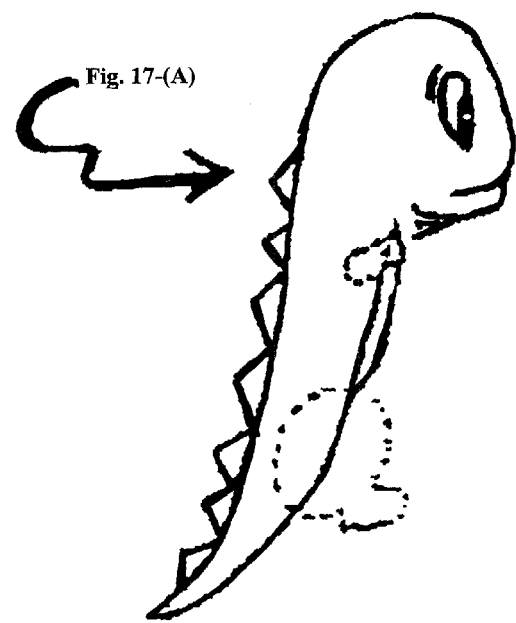
Fig. 17-(A)

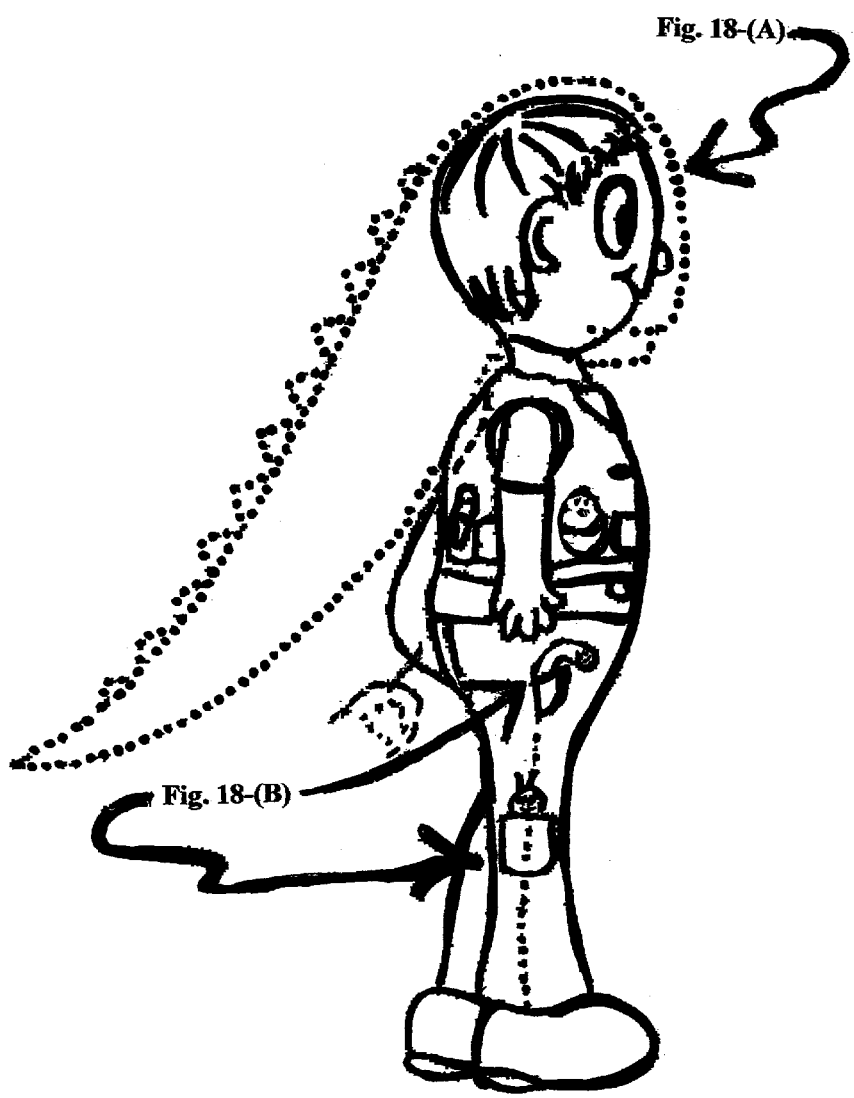

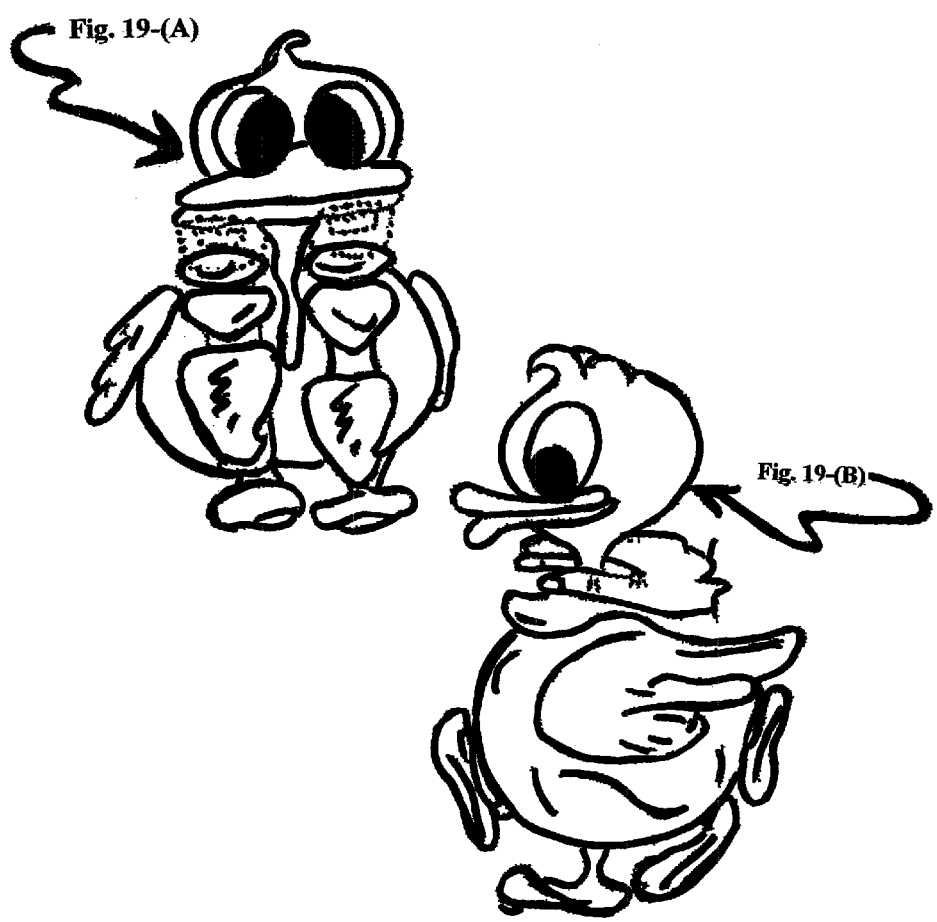

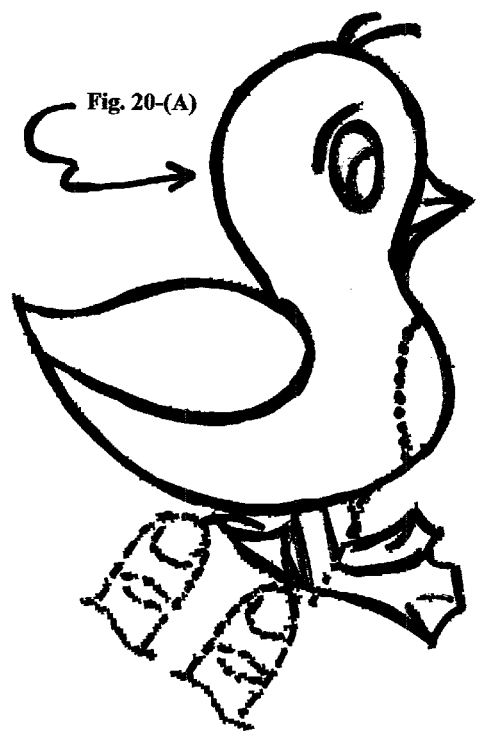
Fig. 20-(A)
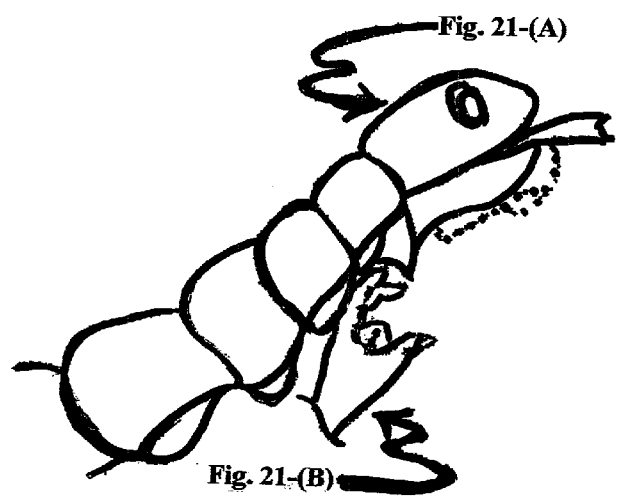
Fig. 21-(A)
Fig. 21-(B)

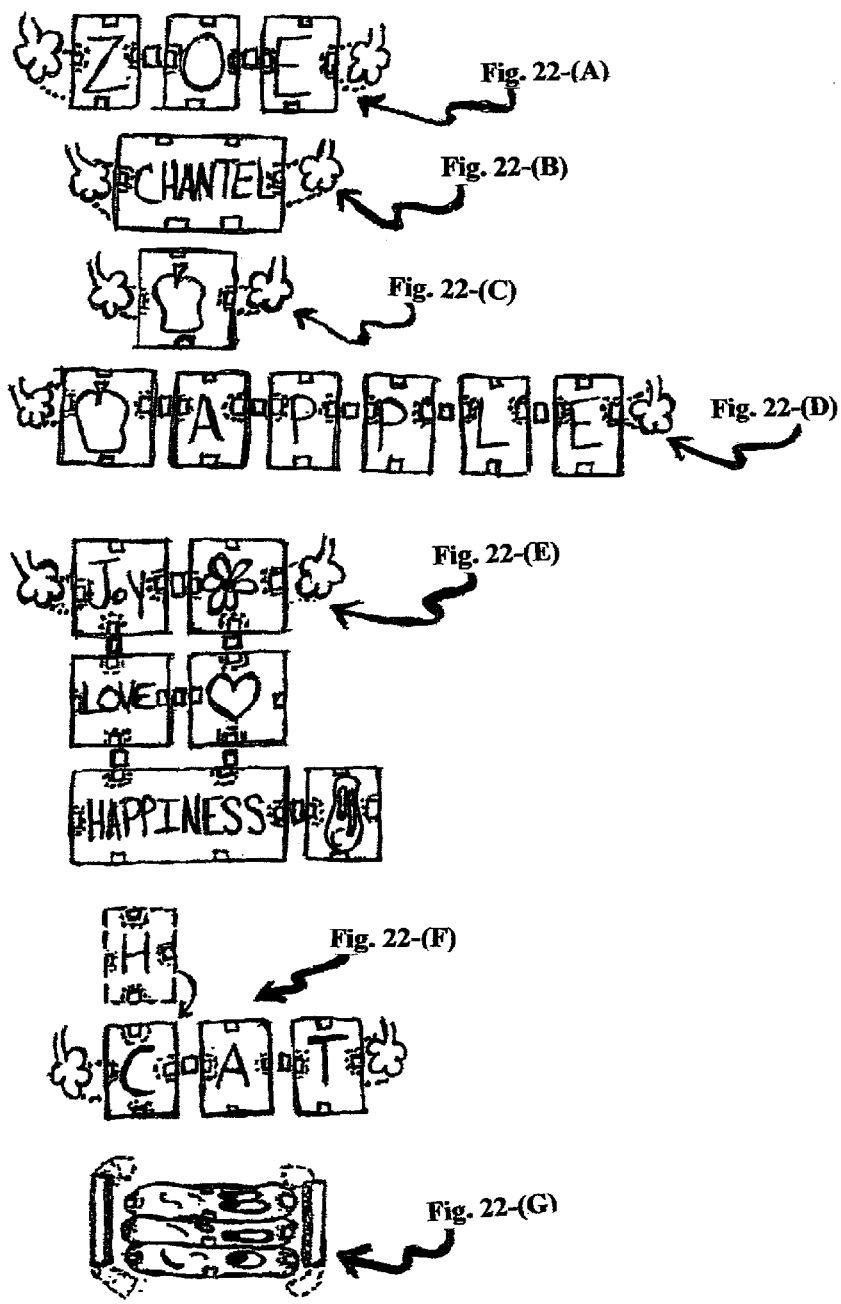

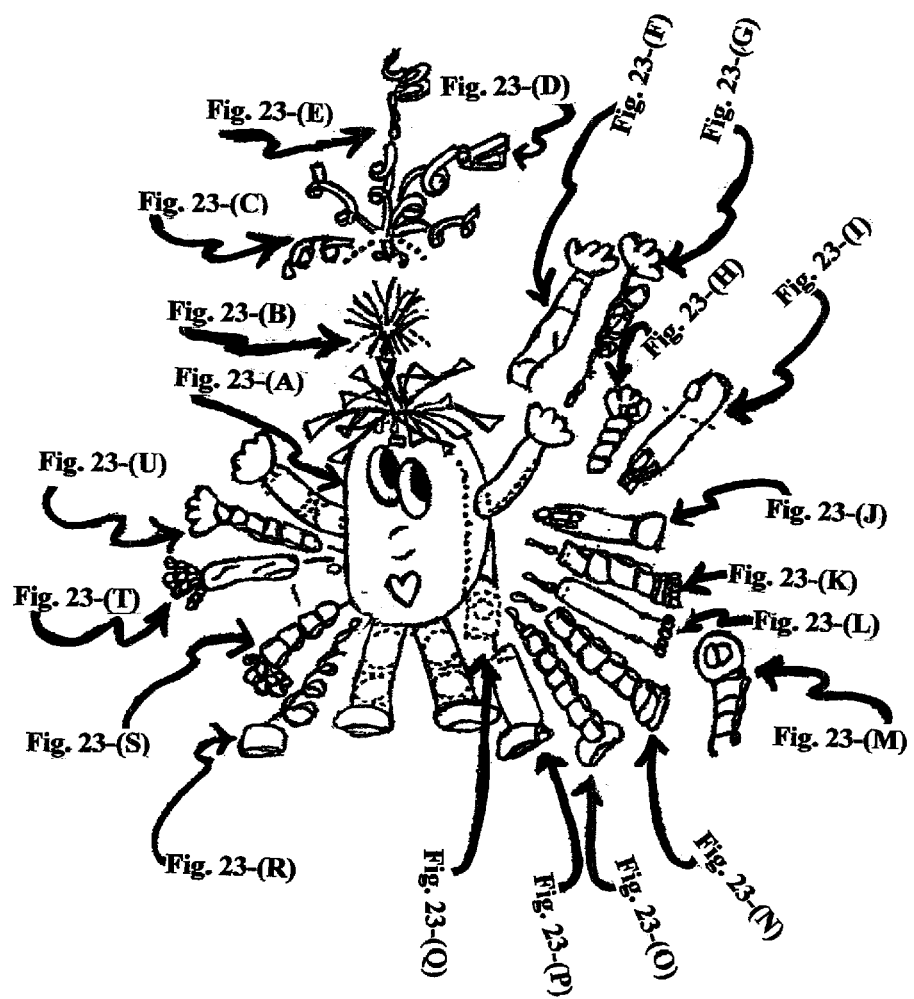

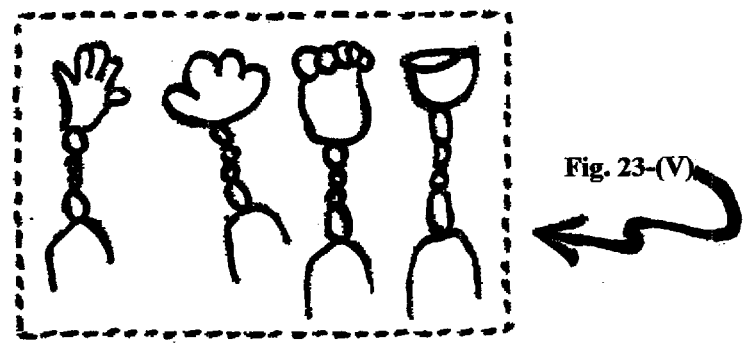
Fig. 23-(V)
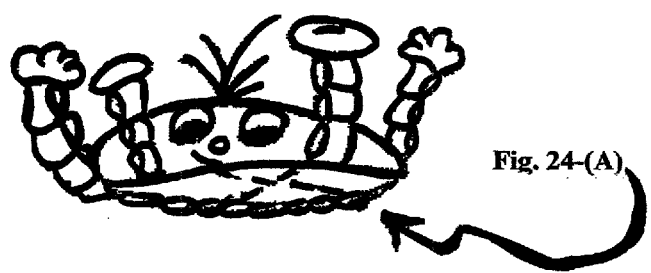
Fig. 24-(A)
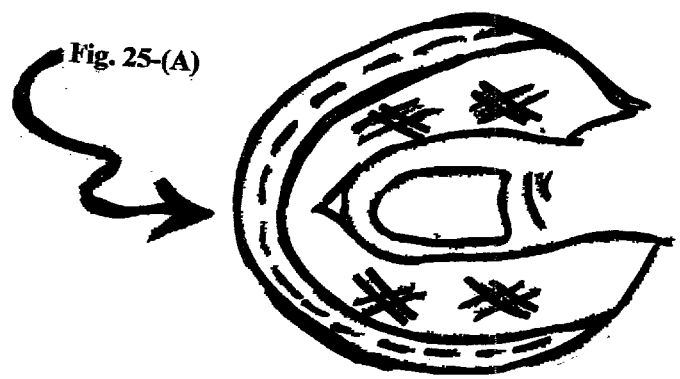
Fig. 25-(A)

Fig. 26-(A)
Fig. 26-(B)
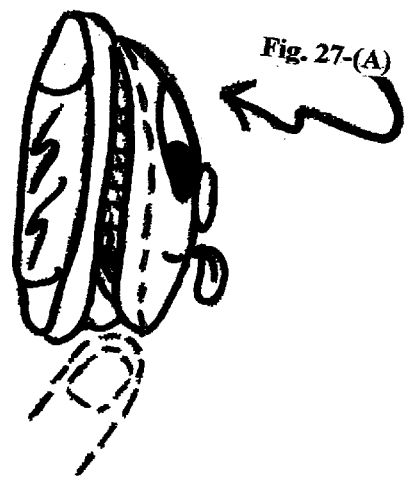
Fig. 27-(A)

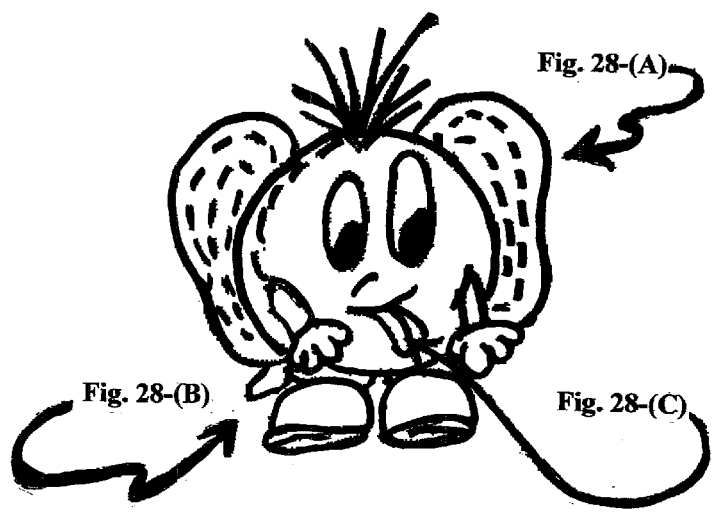

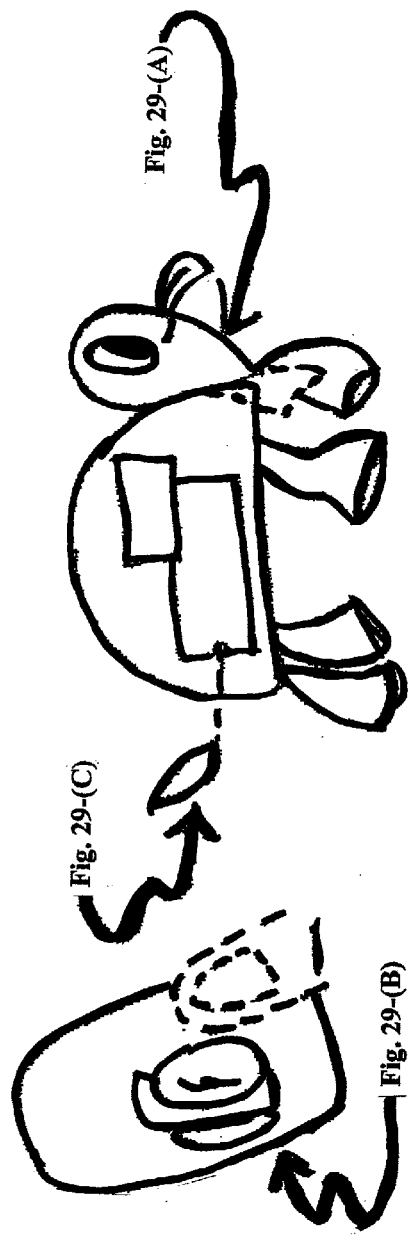

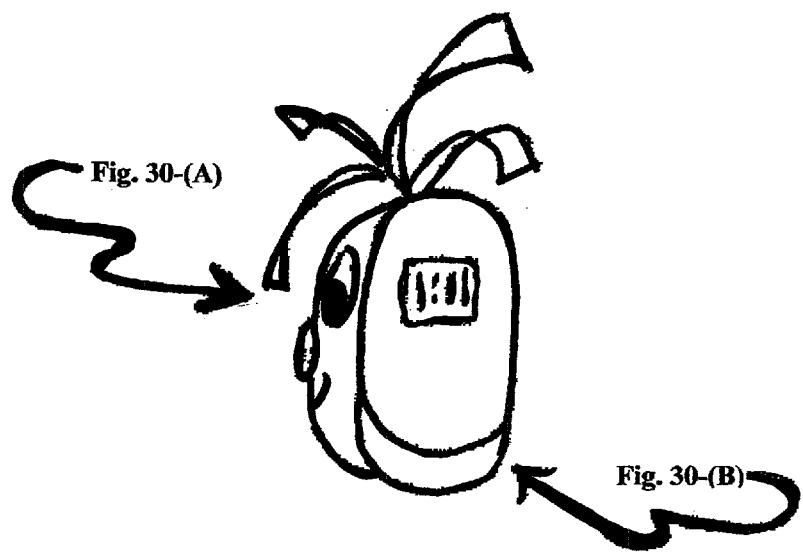
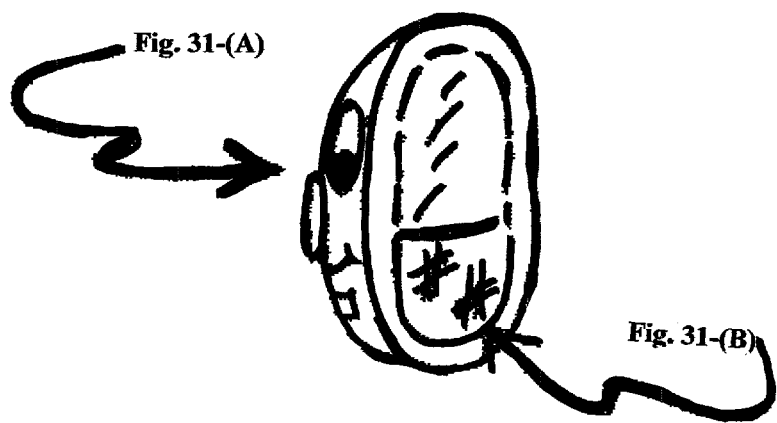

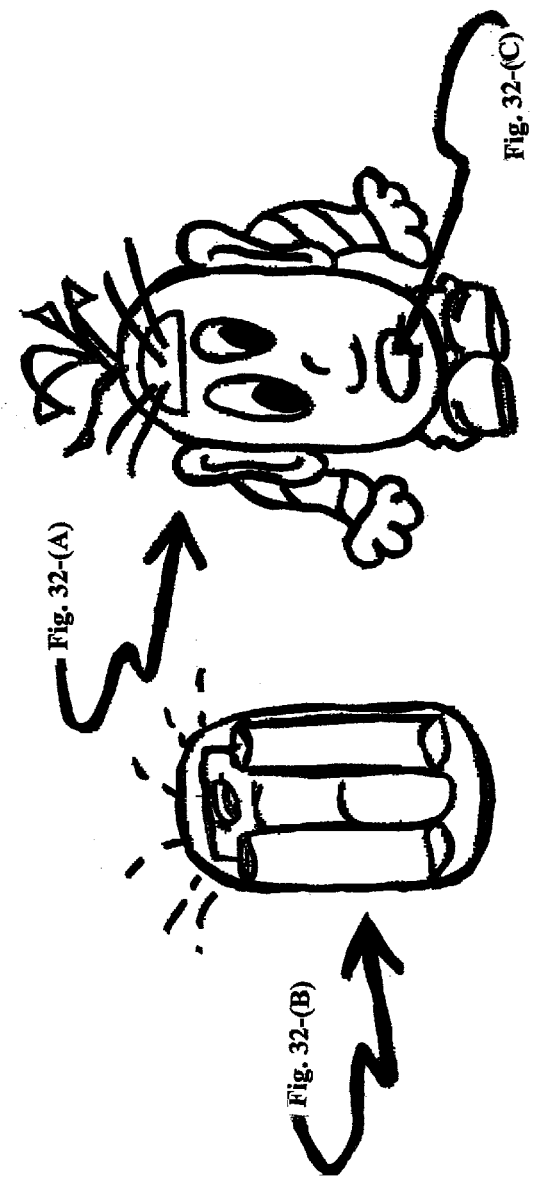

METHOD AND DEVICE FOR DIAGNOSING AND APPLYING TREATMENT FOR THE EMOTIONAL, PHYSICAL, AND COGNITIVE DEVELOPMENT OF A CHILD FOR A MULTICULTURAL SOCIETY

I claim benefit of a Provisional No. 61/004,671—Nov. 28, 2007.

FIELD OF THE INVENTION

The present invention relates to a method and device for diagnosing and applying treatment for the emotional, physical, spiritual, and cognitive development of a child by presenting illustrations having social and emotional attributes so the emotional, physical, spiritual, and cognitive levels of the child can be further developed in our multicultural society. This is a pyramid with hand/finger puppets, emotional faces, intellectual, educational and physical attributes.

DESCRIPTION OF THE PRIOR ART

This inventor has 3 previous patents. They are a design Pat. No. D299,938—February 1989—Doll; U.S. Pat. No. 6,422,871—July 2002—Educational System, Method and Doll for Teaching Individuals their Emotions Employing sets of Faces Expressing Different Emotions with Plural States (doll); U.S. Pat. No. 6,540,518—April 2003—Educational System, Method and Doll for Teaching Individuals their Emotions Employing sets of Faces Expressing Different Emotions with Plural States (method). Other inventor's art, (Goldman et al.), is Blocks with Faces-U.S. Pat. No. 6,685,477 and is mainly about blocks. Another person, (Tehan) is a Method and Apparatus for Teaching Reading-U.S. Pat. No. 5,567,159. This is a method and apparatus for teaching reading and spelling skills to children with short term memory and disabilities. Lastly, Cubeta et al. invented a Reading Learning Tool with Finger Puppets—U.S. Patent Number 20030186198. He has many finger puppets to add to story book time.

In research of human motivation, W. Huitt wrote about Maslow's Hierarchy of Needs in *Educational Psychology Interactive*, Valdosta State University, and stated Maslow created a pyramid theory of the hierarchy of human needs. The pyramid was divided into two groups: deficiency needs and growth needs. Deficiency needs must be met at each basic level before moving up the hierarchy to the next level. The first four levels are (1) physiological: hunger, thirst, bodily comforts, (2) safety/security: out of danger; (3) belongingness and love: affiliate with others, be accepted; and (4) esteem: to achieve, be competent, gain approval and recognition. Maslow believed a person continues to grow if and only if deficiency needs are met. The step beyond meeting deficiency needs is self-actualization. To be a self-actualized person, human characteristics need to: (1) be problem-focused; (2) incorporate an ongoing freshness of appreciation of life; (3) have concern about personal growth; and (4) be able to have peak experiences. Maslow later developed two upper growth needs before acquiring self-actualization. These growth needs are (5) cognitive: to know, to understand, and explore; and (6) aesthetic: symmetry, order, and beauty. Only then did he believe that (7) self-actualization, or to find self-fulfillment and realize one's potential, would occur. Maslow later added level (8) self-transcendence: to connect to something beyond the ego or help others find self-fulfillment and realize their potentials. At this level, the individual becomes wise (develops wisdom) and automatically knows what to do when experiencing life/living situations. Maslow's Hierarchy of Needs has been one of the most popular and oft-cited theories of human motivation.

Maslow generally wrote about adult behavior. The development of basic beginnings of humans and children were not discussed by Maslow.

Jean Piaget, another educator, wrote about human growth levels in "The Growth of Logical Thinking from Childhood to Adolescence," in which he stated a theory for development stages that a child may go through to be a balanced child. There are four development states that are described in theory as:

Sensorimotor stage: from birth to age 2 years (children experience the world through movement and senses and learn object permanence). In this stage they learn to reverse their actions to basic activities.

Preoperational stage: from 2 to 7 (acquisition of motor skills). In this stage they have the ability to form and use symbols, such as words, gestures, signs, images, etc. Their earliest use of symbols is in pretending or miming.

Concrete operational stage: from ages 7 to 11 (children begin to think logically about concrete events). In this stage they learn to understand three basic aspects of reasoning: identity, compensation, and reversibility. Also, they master classification, such as grouping objects into categories.

Formal operational stage: after age 11 (development of abstract reasoning). In this stage they take mental tasks involving abstract thinking and coordination of a number of variables.

Dr. Piaget's development stages are a way of specifying where each child is in the development of one's intellectual abilities, but it's Maslow's Pyramid that encompass their environment around them.

These stages are adapted and balanced to a child's needs that encompass their environment around them of emotional, physical, spiritual, and intellectual growth. Recent society has changed and because of our technological era that our children are achieving more at an earlier age. So, by kindergarten, young children are reading.

The above-cited educators believed that an individual needs to achieve each stage before moving to the next stage, but if a child has problems they could revert back to the beginning. Many parents of children in today's world have a lot of concerns with mental, emotional, physical, or spiritual well being that deal with events of transitions, identity or developmental challenges such as injury, abuse, illness, loss, death, bullying, family/social relationship change, friendship or family break-up, re-partnered families, adoption, self esteem, culture, sexuality, emotions, behavior and communication. This is where the versatile finger puppets of the present invention are emphasized by utilizing play therapy for children in less fearing techniques. The children use versatile finger puppets techniques for reading by flipping the pages of a book and using any other add-on tools to imprint their reading abilities and can begin to resolve internal conflicts, if any.

SUMMARY OF THE INVENTION

The invention comprises a method of diagnosing and applying treatment for emotional, physical, and cognitive development in a child by presenting graphic representations of emotions, physical, and cognitive illustrations so that the child may relate to them and express and achieve self-improvement. The method may be directed at children who are challenged in an effort to provide fulfillment and self-esteem or stability to their lives. Once emotional stability is established or self-esteem is present, one develops a healthy foundation for learning, increased cognitive abilities, and maturity. The Pyramid captures a child's surrounding within their environment in an intra- and interpersonal way from simplistic to complexity. The finger puppet is the tool to connect the above plus it is a page turner for continuous progress for a child to develop in a healthy balanced life by reading.

For children not emotionally challenged, the method of the present invention can also be utilized to stabilize their emotional, physical, and cognitive foundation. Indeed, the method can be applied on a periodic basis to monitor their foundation. This could lead to nurturing and bonding to caregivers or mentors and provide a normal progression to emotional, physical, and cognitive stability into maturity.

One aspect of the present invention is related to developing a child's physically, mentally, cognitively, and emotionally from birth on up using versatile finger puppets. There are levels that the child goes through in learning . . . from Geometric Shape, emotionally, pre-physical forms, to ethics and morality this is Basic Beginning Needs—(of) Fulfilling The Five Senses (Level One), to Complex Structures—Safety and Security In Structures (Level Two), to Movement Of Animals-Belongingness With Love Of Affection (Level Three), to Human Accomplishments, Building Self-Esteem and Gaining Approval Of Recognition in Human Abilities—Planting Seeds of Cognitive and Physical Abilities (Level Four), to shape-, emotional-, pre-physical-, structural-, animal-, and human-like or Making Themselves As A Look-a-Like—Building Cognitive Abilities—Sprouting of Cognitive and Physical Abilities (Level Five), to physical and physical-like which is Physical Development—Finding Order and Beauty Within and Around Abilities—Building of Physical Abilities (Level Six), then to all learning levels working together on a Higher Development—Actualization—Ability To Grow and Share (Level Seven). The horizontal growth effect is just like any living thing . . . it starts out small like in baby form and ends up as an adult. If it was a non-living form, such as shapes in the first level of the pyramid, they would start out small and grow in size. This also is for structures, they would start out small and simple and grow in size to a complex structure. Also, all characteristics, such as facial features and limbs etc., may be applied to a non-living object. This pyramid designed to go from simple to complex geometric visual shapes is so an evaluator can determine exactly where a child's cognitive thoughts are at the moment. The child may one day pick a simple form and the next a more complex or vice-versa. What is important is what one (the child) picks on a consistence bases or most often. This is an intra- and inter-personal dynamics pyramid of our multicultural society.

One aspect of the present invention is a method designed to make things reduce fear in a child's development in a physical, mental, cognitive, and emotional way that is similar to the levels of Maslow's Hierarchy of Needs, but doesn't address beginnings for children. It's an entity that moves in any direction, but always trying to achieve a level of normalcy. Color is another common aspect to be considered when children are concerned because once they're able to observe (i.e. thru the senses) and think they are able to emulate different things within their environment.

The "Senses" are important because they are how we experience life. Sight is primary . . . because part of evolutionary adaptation seen in primates is related to the ability of seeing greens and red of the U-V spectrum. Primates and birds of prey are the only ones that can see greens and reds of the U-V rays. The U-V rays are like the colors of the rainbow red, orange, yellow, green, blue, indigo, and violet. These colors if light, are less feared then the dark. Hearing, touching, smelling, and taste are the secondary. These senses all work together to play a big role in the development of growth for a child. They can be a part of any level of the pyramid vertically or horizontality.

"Color Therapy" is another aspect of the present invention used to bring harmony to the full process of learning. Next to consider is types of materials.

"Material Therapy" is another aspect of the present invention for the finger puppet. Material therapy for children utilizes soft materials and then harder materials, some like plastics, as their age progresses, for tactile sensations.

Another aspect of the present invention emphasizes "Ethics and Morality," which are evoked in a sensory manner when children learn from human connection or communication.

Another aspect of the present invention relates to a method of diagnosing and treating the emotional, physical, and cognitive development of a child using a plurality of groups in indicia including at least two symbols, typically faces, animals, or humans that depict levels of need for a child. The child selects a finger puppet having a geographic design from any of the 7 levels of pyramid (vertically and development within each level) which attracts the attention of a child. The child then selects an illustration from a group of illustrations wherein the illustration has at least two symbols based above the initial emotional level of a child. One symbol is always a happy or joyful expression. The child then selects an illustration from the proceeding group and places that symbol on that finger puppet. The finger puppet is equipped with attaching means which may be hook and loop fasteners at any location on the finger puppet, whether it be a head, stomach, extremity, hand or foot, etc. The finger puppet is then manipulated by adding the remaining illustrated emotion to the finger puppet. This emotion is typically a representation of joy or happiness. The two emotional illustrations are then removed from the finger puppet. This step indicates emotional stability for the child. Further, a book or other reading material that is of interest is then read to the child using the finger puppet which has an attachment on an extremity or on other location of puppet that enables the child to turn pages. It is healthier for the child to use the finger puppet on an old book than to lick his finger and turn the page, because you don't know how many others have done the same to the page.

The finger puppets of the present invention may have multiple interchangeable body parts representing social attributes and facial parts representing emotional characteristics. On the bodies and the extremities of the puppets, means for attaching educational exercises are present. These attaching means may be hook and loop fasteners or other convenient means. The educational exercises may comprise of a series of cards, shapes, faces, objects, letters, consonants, vowels, words, phrases, numbers, arithmetic problems, etc. The education lesson is conducted with a mentor utilizing the finger puppet.

DESCRIPTION OF THE DRAWINGS

Other objects and features of the present invention will become apparent from the following descriptions considered in connection with the accompanying drawings which disclose embodiments of the present invention. It should be understood however, that the drawings are designed for the purpose of illustration only and not as a definition of the limits of the invention.

FIG. 1 is the front view of a pyramidal schematic of the hierarchy of children's needs. The first level is geometric shapes (FIG. 1-(A)), second level is a structural level (FIG. 1-(B)), third level is movements of animals (FIG. 1-(C)), fourth level is human accomplishments (FIG. 1-(D)), fifth level is making themselves as a "look a like" (FIG. 1-(E)), sixth level is physical development (FIG. 1-(F)), and seventh level is the higher development (FIG. 1-(G)).

(FIG. 2) shows the front views of a series of faces indicating degrees of growth of emotions starting with sub-sub-due (FIG. 2-(A)), sub-due (FIG. 2-(B)), normal (FIG. 2-(C)), exaggerated (FIG. 2-(D)), goofy or wiggly (FIG. 2-(E)), sub-due puzzled (FIG. 2-(F)), exaggerated puzzled (FIG. 2-(G)), and objects to goal working to normal (mapped) faces (FIG. 2-(H)) with a smaller smile face add-ability, plus a blank face (FIG. 2-(I)).

(FIG. 3-(A) through (F)) shows examples of front view of attachments and additional functions of finger puppets in a physical form, plus a blank finger puppet. All have with rubbery bottoms. These may have 2-D or 3-D feeling faces applied (like illustrations in (FIG. 2 (A) through (I)) to their forehead with hook and loop material or other attachable type material.

(FIG. 4-(A) through (C)) is the front view of examples of rubbery bottom geometric shapes—the triangle, square, circle with a sample of an attachable of a 2-D semi-side view of a feeling negative face with a front view of a small positive face to be attached for the geometric shape level 1 of the pyramid (FIG. 1-(A)). All may have 2-D or 3-D feeling faces applied (like illustrations in (FIG. 2-(A) through (I)) to their forehead with hook and loop material or other attachable type material.

(FIG. 5-(A)) shows a semi-side view of a geometric shaped finger puppet with hair and rubber heart shape on belly (FIG. 5-(B)) for the first level-Geometric Shape [[(FIG. 1-(A)) of the pyramid. This may have 2-D or 3-D feeling faces applied (like illustrations in (FIG. 2-(A) through (I)) to their forehead with hook and loop material or other attachable type material.

(FIG. 6-(A)) shows a back and (FIG. 6-(B)) front view of a finger puppet with rubbery bottoms that functions as a bubble blower and (FIG. 6-(C)) a front view held by extremities for the first level-Geometric Shape (FIG. 1-(A)) of the pyramid. This may have 2-D or 3-D feeling faces applied (like illustrations in (FIG. 2-(A) through (I)) to their forehead with hook and loop material or other attachable type material.

(FIG. 7-(A)) shows a side view of a representation illustrating a house of the structural form in the second level-Complex Structures (FIG. 1-(B)) of pyramid. This may have 2-D or 3-D feeling faces applied (like illustrations in (FIG. 2-(A) through (I)) to their front view with hook and loop material or other attachable type material.

(FIG. 8-(A)) this is a representation illustrating a dog's front view with a tongue made of rubber and (FIG. 8-(B)) a side view shown with an extremity for the third level—Movement of Animals (FIG. 1-(C)) of the pyramid. This may have 2-D or 3-D feeling faces applied (like illustrations in (FIG. 2-(A) through (I)) to their forehead with hook and loop material or other attachable type material.

(FIGS. 9-(A) and 9-(B)) shows a representation of two hand/finger puppets illustrating the front view of school children that can wear the emotional faces (like illustrations in (FIG. 2-(A) through (I)) attached by hook and loop material or other attachable material and have rubber on upper body made for the fourth level-Human Accomplishments (FIG. 1-(D)) of the pyramid.

(FIG. 10-(A)) is the top view of a representation illustrating a snake with (FIG. 10-(B)) a material covered with stretchy material for the sixth level (FIG. 1-(F)) of the pyramid. This may have 2-D or 3-D feeling faces applied (like illustrations in (FIG. 2-(A) through (I)) to their forehead with hook and loop material or other attachable type material.

(FIG. 11-(A)) is the front and back view of a hand/finger puppet of a representation illustrating a fan folded worm to show where (FIG. 11-(C)) hook and loop material may be placed on the tale, along with rubbery area that is on the back side of the worms head (FIG. 11-(B)). Next (FIG. 11-(E)) is a front view of a representation illustrating a fan folded hand/finger puppet character with stretchy arms and a loop attachment for hanging ability along with the possibility of swivels at both ends (FIG. 11-(D)) of character. The third (FIG. 11-(F)) is a front view of a hand/finger puppet of a representation illustrating a frog with stretchy arms and legs and a rubber belly. The fourth (FIG. 11-(G)) is a front view of a fury fan folded hand/finger puppet of a representation illustrating of a character with six stretchy arms and a rubbery face. The next (FIG. 11-(I)) is a front view of a hand/finger puppet of a representation illustrating a character with that has long hair and many stretchy arms and all of them made of a rubbery material. The last (FIG. 11-(H)) is a top view of a hand/finger puppet of a representation illustrating a spider that has eight stretchy legs with rubbery feet. All these have a purpose in the six level-Physical Development (FIG. 1-(F)) of the pyramid. All may also have 2-D or 3-D feeling faces applied (like illustrations in (FIG. 2-(A) through (I)) to their forehead with hook and loop material or other attachable type material.

(FIG. 12-(A)) is a front view of a hand/finger puppet of a representation illustrating a character that holds two babies (FIG. 12-(B)) in the front. This is for the seventh level-Higher Development (FIG. 1-(G)) of the pyramid. All may have 2-D or 3-D feeling faces applied (like illustrations in (FIG. 2-(A) through (I)) to their forehead with hook and loop material or other attachable type material.

(FIG. 13-(A)) is a front view of a hand/finger puppet of a representation illustrating a caterpillar that has a baby (FIG. 13-(B)) wrapping their stretchy arms around them like having a piggy back ride. This is for a seventh level-Higher Development (FIG. 1-(G)) of the pyramid. Both may have 2-D or 3-D feeling faces applied (like illustrations in (FIG. 2-(A) through (I)) to their forehead with hook and loop material or other attachable type material.

(FIG. 14-(A)) is a side view of a representation illustrating a pig that is a puppet costume with a stretchy neck or possibly just under the chin that can be with or with out limbs. This character is called a piggy-back costume that fits over an object representing a figure in the level five-Making Themselves as a "Look-a-Like" (FIG. 1-(E)). A hook and loop or an attachable material can be applied for a 2-D or 3-D feeling face (like illustrations in (FIG. 2-(A) through (I)) placed on the forehead of costume.

(FIG. 15-(A)) is a side view of a representation illustrating a horse that is a puppet costume with a stretchy neck that can be with or with out limbs. This character is called a horsy-back costume that fits over an object representing a figure in the level five—Making Themselves as a "Look-a-Like" (FIG. 1-(E)). A hook and loop or an attachable material can be applied for a 2-D or 3-D feeling face placed on the forehead of costume.

(FIG. 16-(A)) is a side view of a representation illustrating a lady bug that is a puppet costume with a stretchy neck that can be with or with out limbs. This character is called a lady (bug) back costume that fits over an object representing a figure in the level five-Making Themselves as a "Look-a-Like" (FIG. 1-(E)). A hook and loop or an attachable material can be applied for a 2-D or 3-D feeling face placed on the forehead of costume.

(FIG. 17-(A)) is a side view of a representation illustrating a dinosaur that is a puppet costume with a stretchy neck that can be with or with out limbs. This character is called a dino-back costume that fits over an object representing a figure in the level five—Making Themselves as a "Look-a-Like" (FIG. 1(E)). A hook and loop or an attachable material can be applied for a 2-D or 3-D feeling face placed on the forehead of costume.

(FIG. 18-(A)) is a side view of a representation illustrating a human-like character or an object representing a figure using other character-like costumes, and clothing in level 5-Making Themselves as a "Look-a-Like" (FIG. 1-(E)) of the pyramid. There are characters that fit in the pockets (FIG. 18-(B)) of clothing. Also, this can fit into Level six-Physical Development (FIG. 1-(F)) because the clothing can be inverted to help with individual's understanding how to do an exercise. A hook and loop or an attachable material can be applied for a 2-D or 3-D feeling face placed on the forehead.

(FIG. 19-(A)) is the front view and (FIG. 19-(B)) side view of a representation illustrating a duck held by extremities to walk duck and to have duck's feet which are rubber stop and turn the page. The stop from walking button is on the back of character. A hook and loop or an attachable material can be applied for a 2-D or 3-D feeling face placed on the forehead.

(FIG. 20-(A)) this is a side view of another way two extremities can manipulate rubber feet to turn pages. A hook and loop or an attachable material can be applied for a 2-D or 3-D feeling face placed on the forehead.

(FIG. 21-(A)) this is a side view of a representation illustrating a fan-folded snake held (FIG. 21-(B)) by extremities or an extremity. There is a rubber area on the bottom of chin to turn a page. A hook and loop or an attachable material can be applied for a 2-D or 3-D feeling face placed on the forehead.

(FIG. 22 (A) through (G)) shows cards held by the finger puppet that may contain shapes, faces, objects, letters, numbers or words phonics for cognitive therapy and their stackability.

(FIG. 23-(A) through (V)) shows various embodiments of a finger puppet wherein the extremities represent multiple ways of facile manipulation. A hook and loop or an attachable material can be applied for a 2-D or 3-D feeling face placed on the forehead.

(FIG. 24-(A)) is the upside down view of finger puppet to show how stretchy material may be in to hold extremities. A hook and loop or an attachable material can be applied for a 2-D or 3-D feeling face placed on the forehead.

(FIG. 25-(A)) is the cross section of a extremity and inside of puppet with filling material.

(FIG. 26-(A)) is a upside down view of a hand/finger puppet that could have a finger holder (FIG. 26-(B)) for better movement or control of the turning of a page. A hook and loop or an attachable material can be applied for a 2-D or 3-D feeling face placed on the forehead.

(FIG. 27-(A)) is the side view of a character for insertion electronic and non-electronic devices. A hook and loop or an attachable material can be applied for a 2-D or 3-D feeling face placed on the forehead. Rubber area with a pocket behind it is placed on character so pages can be turned.

(FIG. 28-(A)) is a front view of a character with fiber optic possibilities. A hook and loop or an attachable material can be applied for a 2-D or 3-D feeling face placed on the forehead. Extremity pocket (FIG. 28-(B)) will be place according to rubber area that could be a facial feature(s) (FIG. 28-(C)), limb(s), and body for turning of pages.

(FIG. 29-(B)) is a cross section and a side view of a character that has a vibration system within. Where if you pull a cord (FIG. 29-(C)) the subject will vibrate. This character will still have a rubber section applied (FIG. 29-(A)) with an extremity pocket behind it so pages can be turned.

(FIG. 30-(A)) is a back view of a character with a clock chip or any kind of computer chip (like a GPS system) within. A hook and loop or an attachable material can be applied for a 2-D or 3-D feeling face placed on the forehead. Extremity pocket (FIG. 30-(B)) will be place according to rubber area that could be a facial feature(s), limb(s), and body for turning of pages.

(FIG. 31(A)) is back view of a solar operated character. This solar may need to be curved in order to accommodate character. Extremity pocket (FIG. 31-(B)) will be place according to rubber area that could be a facial feature(s), limb(s), and body for turning of pages. A hook and loop or an attachable material can be applied for a 2-D or 3-D feeling face placed on the forehead.

(FIG. 32-(B)) is a cross section of a battery pack and a front view (FIG. 32-(A)) of a character with indications of light eliminations. The battery pack may change in size to accommodate convenience. Extremity pocket will be place according to rubber area (FIG. 32-(C)) that could be a facial feature(s), limb(s), and body for turning of pages. A hook and loop or an attachable material can be applied for a 2-D or 3-D feeling face placed on the forehead.

DETAILED DESCRIPTION OF THE INVENTION

Abraham Maslow developed a human needs pyramid theory for adults generalizing it throughout all ages and FIG. 1 shows what it would be for a growing child's emotional, physical, and cognitive growth. The following is a description of the various levels of the pyramid as it relates to children.

The word "child" in the subject invention has a broad definition using the concept of cognitive ability. Thus, "child" is not based solely on age, but the cognitive effects listed in the 7-pyramid levels of FIG. 1. For example an autistic teenager can have a number of these pyramid levels attributes. Also, an older adult can have such a pyramid distribution.

Pyramid does include a pyramidal schematic of the hierarchy of children's needs. The vertical and the development with in each level goes from simplistic to complexity according to size, color, shape, material, no sound, sound, regular clothing, inverted clothing, human, non-human, animal, non-animal, look a likes, to not look a-likes, to simplest form in style, to complexity in style (maybe bling-shinny stuff added), no electronics, to electronics, non-eatable, to eatable, no additions, to having additions, no add-ons, to add-ons, to inter-personal, intra-personal, etc. . . . This Pyramid captures a child's surrounding within their environment then helps other growth to occur within . . . emotional (mental, spiritual, and cognitive growth); educational (intellectual growth); and physical (symmetry, balance, order and hygiene growth) into abilities. The Pocket Puppet Reading Pal™ Finger Puppet is the tool to connect all of the above subjects for continuous progress a child needs to develop in a healthy balanced life. This could be adapted for computer uses, (ie . . . games, etc.).

There are several ways that the finger puppet may have a connection to the paper. It could be a rubber patch, strips of rubber, a finger jell pad, rubber on the outside with a finger holder on the inside, rubber sections placed inside and out of area that touches the finger and the page, a temperature activation turning, sound activated, light activated, bubbled up rubber, a finger rubber that is sewn into the finger area, rubber on the outside with cushion on the inside to keep finger from sliding around, and rubber feet frozen to turn the pages. Ways of building communication are books for the pyramid, emotional, physical, and educational going from simplistic to complex with different sizes, of colors (light color is less feared than a darker), shapes (small is less feared than large), and materials (soft is less feared than rough). So, CD-DVD's for physical activity plus process or methods on physical and educational books and possibly onto computer.

This method was developed because there are so many trials and tabulation that a child may go through in their years. There needed to be a way for children to come through the difficulties and stay on track by listening to their inner voice. Life has many challenges and this is a way for a child to over come them with ease.

Emotions+Puppet+Reading and Drawing—We start out with the finger puppet because of size, its many designs, and both genders or any race can use it without repercussions or discrimination. The pyramid is used to give an individual a choice of the type of hand/finger puppet that would be best used for their playtime. Different styles of finger puppets are used to accommodate different ages, as well as, possible mentally challenged or handicaps within our multicultural society. It is this choice that builds their self esteem. So, their choice from the pyramid gives the parent, care giver, or professional instructor some idea of how they are feeling without drawing attention to it verbally. The pyramid goes from Level #1 being to simplest vertically to Level #7 being most complex. If they pick the simplest it means that they don't want to deal with anything to complicated. If their choice is complex (Level #7) then they are ready to tackle anything that comes their way. A discussion of their choice can be approached, so as to or only to solidify their decision. Once again, giving a child a place of no fear or lessening the fear helps them to heal faster from a disappointment that may have come about. This is the Kid Friendly® Technique, which is, doing things to lessen fear in a child in order to let them heal within.

Also, it was important for the child to find comfort in talking to an adult, but in difficult times, talking to the puppet like ($3^{rd}$ person), makes them fill more at ease or lessens the fear. This not only brings out their inner voice, but it helps them to listen to their instincts. It's like having an imaginary friend at their finger tips. The hand/finger puppet also has some hook and loop material or some kind of connecting way to place emotional faces, objects, or accessories on it.

These emotional faces are not only a toy, but a tool to bring out, once again, the child's most inner thoughts. The child can choose from a page or book of faces provided to them. The emotional faces go from simplest starting at sub-subdue, then to subdue, on to normal, to exaggerated, to goofy, on to puzzled, and mapped etc. There is a range so the instructor can determine how the child is feeling without verbally asking. A positive remark can be said, such as, "That's a good choice!" It might start a conversation. If they choose the simplest face then that means they are at their max in dealing with life and want to be withdrawn at this time till their inner self heals some. They may choose the subdue, as their choice. And if this so they are trying to come out of their sadness and feel like taking a chance.

If normal is chosen, then they are ok to tackle life itself. Now, if (delete-complex or -delete) exaggerated is chosen, then they are hiding anger or fear. Next, if goofy, wiggle or funny is chosen, they feel like being goofy or just want to have fun. A puzzled face is a face that is in pieces and physically takes one to put it together. If the child self selects the puzzled face, they might feel as if they are broken or feel the need to fix or put together their choice. Next could be a mapped face, that would have a home or a favorite object that could be symbolizing security on one place of the face, then a connecting/dash/dotted line (this line could be made of objects-human or non-human) to another section of the face that could have a happy place that was enjoyed by child. This happy place could be a favorite fishing hole, a vacation place, a park, or just a happy location, event, goal, to maybe something in the future that is desired. If they self select the mapped face, it would mean that the child would like to run away—if not physically then maybe mentally or may be looking for a happier place or time.

A discussion of their choice can be approached, so as to or only to solidify their decision. Some of these faces can be 2-D or 3-D in form. Also, the emotional faces can be negative or positive. A negative face will be accompanying a small positive face in order to not let the child get stuck in negative feelings. The reason for choices on the faces is for the child to use their inner voice to pick what is most important to them. A special book of faces is made of emotions going from simplistic to complex or goofy-funny on to puzzled, then on to mapped with shape, color, size, and material in mind just for this invention.

This invention takes it one step further and places rubber on finger puppet to let the child use it as a tool that flips the pages of a book while the parent or care giver is reading. This makes the child feel important, that they had a part in the reading of the book. Also, reading is a very important thing in their lives and their interest in books would peak if they have a pal to read with. It also, helps them to stay on track with their life because its reading that can help a poor child become or have richness for knowledge.

Emotions+Puppet+Physical Activity+Reading and Drawing

Physical Activity is being Pro-Active in a Child's Personal Health, Self Esteem, Coordination, and Concentration with Less Fear In this section, the pyramid and emotions are used much in the same way as above, but with a few changes. The Kid Friendly technique going from simplistic to complexity in a pre-physical to physical way which would show a pro-active technique to bring about more self esteem. This technique also brings about more blood flow for the inside muscles like organs, such as the heart, and helps a child to concentrate. The child first picks the emotion on how hard they want to work out. Then they pick a puppet with special clothing called inverted or upside down clothing. Generally on the pyramid would have regular clothing at any level, but for exercise the upside down clothing would be used. A typical example is a hat, dress, socks, or vest, (etc.) that has animals on top and when turned upside down has buildings.

This clothing is special not only because its unique in that it gets children to move in ways they may not think, but it is also special in that it has special connectors to hook onto a stretchy band, so the child can exercise with a friend. Example of this for an exercise would be a hat. On one side a hat of a puppet could have fish and if the child raises his hat up to take off the hat, it could have a frog jumping out at them from inside or have frogs printed in the inside of hat. By using this method it could get give a much greater understanding of a movement so it could be accomplished faster, such as first raising their hands above their heads to learn how to do a summersault.

There is a foremost pre-physical way that gets muscles to move without much thought. Examples of those are a baby first sitting up, sucking, rolling over, crawling, and on to walking. Similarly like the first involuntary emotions would be smile, crying, and contentment. Sound would be used to verbalize words. Involuntary touch is when a child grabs anything and everything that could be placed in the mouth. At this point the child is unaware of what they are actually feeling. The toys would all have to be of environmentally safe material. Then the child will cognitively learn to accomplish tasks physically.

Once the emotion is picked, the puppet of special clothing, and stretchy band (this band can be from something that fits to belt to a form of jewelry—wrist band, necklace, ring, etc.) and finally a type of physical activity. These activities would be in CD or DVD form (something that would use the senses of hearing or visualizing) which would go from simplistic to complex for the child to pick from just for this invention. The parent or care provider may want to choose this one depending on the abilities of the child, some physical fitness work out exercises may have a make believe character costume just like a finger puppet to perform with child. The physical exercise chosen, the child may feel a need to change the exercise face to another. Discuss the choices that have been made by child, if they wish to talk. Once the exercises are completed and put away, the child may want to hang onto the puppet and go back to reading a book or they may want to draw (drawing promotes creativity and the beginning of independence) and place it onto their chosen puppet. So the physical activity portion of this patent is for personal health, self esteem, coordination, and concentration.

Emotions+Puppet+Educational Activity+Reading or Drawing

Educational Activity is to promote balanced thought, understanding, comprehension, and the ability to learn to follow directions, in being proactive in promoting a child's life that goes from dependant to independent with less fear.

In the beginning of learning the child is at the mercy of a parent or caregiver to read to them (emotion+puppet+reading). They first pick up sounds from the readings and then they learn to memorize. Once this is done, they're learning: shapes, colors, alphabet, numbers, phonics, their name, small words, their address, syllables, small sentences, vowels, constants, opposites, longer sentences, maps, 2-D to 3-D puzzles, and reading books on their own. This may not be exactly in the same order used for all but it gives us an idea of how the English language or different skills might be learned and there may be more of the learning activities. The list above can be an individual or multi-learning activity that go from simplest to complex or small to large in size made just for this invention.

The following steps would be used for the Educational Activity which is similar to the Emotions+Puppet+Reading and Emotions+Puppet+Physical Activity+Reading or Drawing. First like others, the child would choose the emotions (symbols) from the page or book. Next, they would pick their puppet from the intra- or inter-personal pyramid to do their Educational Activity. The parent or caregiver would pick the learning activity (listed above) of what to start and the child can choose within the set. The learning activities are pages within a book going from simplest to complexity in different sizes, materials, colors, and shapes just for this invention. Story books also will be written in such manner. Next, the lesson would be completed. You would then put it away and sit down to read a book with their reading pal. They may also do drawings afterwards to place onto puppet. Once done, place everything back from where they got it because it will let them start out fresh next time.

This is why the intra- and inter-personal pyramid is important for the method of the reading puppet when it goes from simplistic to complex not only horizontally but vertically. Included in this pro-active process are the emotions, physical, and educational ideas to be built in the simplistic to complex with goofy-funny added on for color, size, shape, and material. Also, would be the CD's and DVD's for the physical fitness of the project. Going from simplistic to complex is the Kid Friendly Technique.

In every physical, emotional, mental or spiritual act, the self of each specific person reproduces itself, maintaining a unique boundary with the surrounding world, and "evolves" in structural coupling with its environment according to Vladimir Dinitrov and Robert Ebsary from their article "Intrapersonal Autopoiesis."

This brings about intrapersonal and interpersonal dynamics of an organism. Intrapersonal dynamics refer to the changes that occur within a person, such as developing an identity, having a voice, and achieving success. Interpersonal dynamics refers to exchange between the living and non living, building mentorship, and collaboration, balancing life, and affirmative action according to Faculty for Undergraduate Neuroscience. It is this reason the pyramid was designed.

The pyramid must also take into account our society which has developed into a multicultural world. Multiculturalism is the state of racial, cultural and ethic diversity within the demographics of specified place, usually at the scale of an organization such as a school, business, neighborhood, city or nation.

Level 1—Geometric Shapes . . . . Basic Beginning Needs . . . . Fulfilling the Five Senses This is a step-by-step method of approaching a child's developing order. From the beginning of life we all use our senses to seek our food, shelter, and clothing. Those senses are smell, hearing, taste, touch, and sight. We start with our sight in the form of shapes (herein known as geometric shapes), because that is where most babies begin development.

When a baby is born, he begins to see things only as shapes. As a mother (primary caretaker) talks to a baby, she moves her head, eyes, and mouth. The infant begins to watch the movements of the parental face. The first colors they see are black and white; other colors come along a few months later. Babies innately learn their emotions from their needs. If they need a diaper changed, they cry. If they are hungry; they cry. If they feel pain; they cry. Babies quickly learn that they get the needs met from this action. They learn to laugh by watching their provider laugh. It's these basis stimuli that help to bring about an emotion and fine tune the senses.

The basics are when a baby child learns about his/her physical self. We call it the pre-physical level. The child first has to focus on his mother's facial features that are moving. Then, the child focuses on the mother's hands while she is caring for their needs. To follow through his/her development, the child continues to grow physically. Everyone is so excited when a child learns how to roll over, sit, stand, or walk. In the beginning, the child has to observe it being done first, before he can do it. The child continually watches things that move. While they are learning to sit, babies watch people walk. Crawling becomes their first type of mobility. As they are crawling, they watch the feet of those around them. By watching the feet, they discover that they have feet. The next step is by trial and error. They begin to try to walk.

This level is built into basic geometric shapes because of basic senses. According to the Wikipedia there are 5 main senses . . . Smell; refers to the ability of humans and other animals to perceive odors . . . . Seeing; visual perception is the ability information from a visible light reaching the eyes. The visual system of various physiological components collectively work towards organisms of a complex task of (re) constructing a three dimensional world from a two dimensional projection of the world known as visual perception . . . . Hearing; is the ability to perceive sound by detecting vibrations from the ear. The vibrations then travel to the brain . . . . Touch; requires sensitivity to the movement of molecules in the world outside the organism. Its hearing and touching that are types of mechanosensation . . . . Taste; refers to the ability to detect flavor onto the tongue. There are four taste sensations sweet, salty, sour, and bitter. The Chinese added spicy.

This level was designed because we all have a beginning with basic tools (some described with pyramid) to develop in the simplest form using our senses that get triggered by color and material then moves onto emotions, physical, and educational.

The basic tools in the Geometric Form are at level #1. Each level is depending on or related to the previous one except for level one. In Level #1, emotions are drawn from simplistic to complex starting with sub-sub-due, sub-due, normal, exaggerated, fun or goofy, puzzled, and mapped. This theory is used on every level of the pyramid to help a child to choose with little fear. Take for instance a circle . . . this goes from the sub-sub-due . . . shape of an small oval, to sub-due . . . shape of a larger oval, . . . to normal . . . shape of a circle, . . . to exaggerated . . . shape of a extra large circle, . . . to goofy . . . shape of wiggly circle, . . . to puzzled . . . a circle like object can be in puzzle pieces that can be fitted back together with connecting type material, . . . and lastly, to mapped circle like object . . . that has a starting point (example is a person's home) then foot prints (or other types of images) to a goal or fun vacation some place else.

This structure is used through every level of the pyramid and is called "Kid Friendly". Small in size to larger, onto goofy, puzzled, and mapped is so a child can choose the least feared. The smaller size makes it less fearful . . . large in size makes it be more real and the more real to life the more one can deal with real life situations in a balanced way. Just a shape is simple . . . add on limbs, hair, and facial features . . . etc. makes it more complex. Material when softer is less feared and rough is something that is more to fear. Colors, like pastels, are less feared; the more bold the more feared. Also, brightness means happy or positive and darkness means negative. 2-D is simple and 3-D is most likely complex. The pre-physical at this level is the color jazz shown in the drawings and can be used throughout any levels given in the geometric shape of the level. The horizontal growth effect is just like any living thing . . . it starts out small like in baby form and ends up as an adult. If it was a non-living form, such as shapes in the first level of the pyramid, they would start out small and grow in size. This also is for structures, they would start out small and simple and grow in size to a complex structure. Also, all characteristics, such as facial features and limbs etc., may be applied to a non-living object. This horizontal growth effect is followed or applied throughout each level of the pyramid.

Level 2—Complex Structures . . . . Safety and Security in Structures

The next need that is met is safety structure and security. If left to lie open, a baby feels insecure. But wrapped tightly in a blanket, the baby feels warmth and security, similar to the mother's womb. By using their senses, a baby can intuitively feel any insecurity of the person holding him. This pre-physical status of insecurity is dramatically evident by the startle reaction to loud sounds and unfamiliar movement. At this stage, the child has not yet learned to fear. The safety structure is put in place by the adults with the use of blankets, towels after baths, cribs, walkers, playpens, car seats, highchairs, then moves onto larger noticeable, such as, car, planes, and houses, etc. for the child's protection. This becomes a normal safety and over a period of time, becomes a habit. The child still feels no fear. Often the child is confused because of non-normality. A child has no sense of danger until after pain has been inflicted by normal curiosity. A young child would use a blanket and play peek-a-boo to build security of separation from provider. Pre-physical stages safety can represent oral sensation as everything goes in the mouth, like fingers, keys, money, and other items.

This level was developed because it is fine tuning the sense of touch.

Growth occurs more rapidly with touch and that brings about security. The more security a parent bring to a child, first by touching then by securing in a structural form the faster the learning process for the individual. If this level was chosen, one would acknowledge security was needed.

At this level it is much like level #1, but we are addressing security. You need to find peace within yourself before you can find peace or hope on the outside. So, security is important not to fear . . . by using a few lines of structure, the child would feel less fear . . . if a normal not to complicated structure, the child could find security . . . . Normal structure is a house that is simple and just the right size for the family . . . exaggerated or more lines could mean more to fear . . . goofy structure lines means no straight lines, all wiggly—this could mean the child wants to be secure, but doesn't want so much structure . . . puzzle house means a child would like to have a home again and wants to feel secure again, so by putting the puzzle together they may feel secure again . . . mapped is a house that a child feels secure in, but now, they may work towards getting their own room—work towards a goal. The more secure a child feels the more growth they will acquire. In this stage pockets are essential, too. A sucker could be fit in the finger holding area in order to see one's ability for oral sensation.

A blanket could be placed in a pocket and pulled out for night time sleeping to show security with in their geometric shape at any level. This might then give the child a sense of their own security. Pockets may be utilized an educational level of any geometric shape. Another form of security would be attachment. This could mean that the finger puppet or geometric shape could be having attachment capabilities to other devices. This includes other geometric shapes connecting . . . . Some could have a finger holder on each end of the puppet. This would be called the Flip-flops. These could be used just for one finger or possibly two or more, as shown in drawings.

Level 3—Movement of Animals . . . . Belongingness with Love of Affection

Climbing the levels of the hierarchy, we come to belongingness and love needs. As an infant, the only needs are food and shelter. An infant can survive, but will not thrive. However, if affection and acceptance are included, the child will develop at a more rapid pace. The sound of mother's heartbeat and her scent are only detectable to the infant. This is the pre-physical level. At the physical level, a child will begin to display separation anxiety from family when left in the care of a provider because the provider does not belong in the child's circle. A child will feel anger and betrayal from parents deserting them, which leads to insecurity.

A child associates with baby animals, because they are small like them so they belong. They watch how the adult animals care for their young and associate it with how their parents care for them. As an animal runs from a child for safety, out of curiosity, the child chases the animal and develops the ability to run. The child is at the beginning of language development, which is discovered out of action and reaction. The child is also beginning to develop a sense of independence with wanting to feed themselves. The child also tries to please the adult in return for praise, acceptance, and affection. That is why he/she desires to perform actions such as potty training. The child will use the sense of touch, which is the most predominate source of feedback at this stage. Soothing, soft, quiet sounds fall into this category as well. The feeling of acceptance is felt by the child when being held and the feeling of rejection is felt when a child is isolated in time-out.

This level was designed to bring about love of affection and belongingness to the child which was started in the last two levels, but comes full circle, now. They are fine tuning their senses because they are secure and have love and belongingness. Their awareness for movement by using vision is keen and gets them to look beyond their box or secured area. Any movement, whether it be a living (mostly animals) or non-living object the child becomes curious and tries to use other senses to learn and expand their knowledge of the world around them. If this level was chosen it would show they are secure but have the need to feel love and belongingness.

At the level just described, we want to show movement. A child watches animals or living things (trees, water) environmental (weather) Sub-sub-due is an animal with connectors at the shoulders or hips or both, . . . sub-due is an animal with the head, shoulders, and hips with connectors, . . . normal is movement in all joints, . . . exaggerated is movements in all joints having large body, . . . fun/goofy is movement done in an unusual way . . . example is like an arm where a leg would go and one eye instead of two . . . puzzled is movement of puzzle pieces that fit together, . . . mapped could be a goal on each limb and having foot prints or objects to the heart or possibly the top of the forehead. Since, this level is all about movement, one could utilize springs, coils, fan-folds, elastic gatherings, and swivels on any part of finger puppet. These movements can be implemented into any geometric shape. The horizontal affect is also applied at this level. Some examples are a frog can go from a tad pole to a frog and a butterfly can go from a caterpillar to a butterfly, much like a human goes from a baby to and adult.

Level 4—Human Accomplishments . . . . Building Self-Esteem and Gaining Approval of Recognition In Human Abilities . . . . Planting Seeds of Cognitive and Physical Abilities Carried over from the last level comes the desire for esteem needs. At this level, the child seeks to achieve, to be competent, and gain approval or recognition from providers. In the pre-physical state, the infant has no concept of this need. In the physical state, the child desires acceptance. Evidence of this is found with the desire to communication needs, i.e., I gotta go potty, I'm hungry, I want more, and the statement No! This stage also has the desire to communicate with drawing, sounds, touching, and writing. Children are aggressive to learn and develop the skills to express their needs. A child will feel sad from disapproval and will cry from un-acceptance. A child will smile and laugh from achievement and recognition. A child recognizes acceptance and un-acceptance, approval and disapproval, by the inflection in the parent's voice. A child can feel the difference between, like a pat on the back, in contrast rejection of his behavior, like a time-out. The child becomes aware of differences, ie . . . up/down, under/over, light/dark, heavy/light, old/new, and other opposites. The child is becoming aware of body parts, feet, hands, belly button, nose, ears, eyes, and fingers/toes etc.

At this level, the child learns to build accomplishments by developing self-esteem and gain approval from others for their abilities. This is when if you don't succeed you try and try again in order to accomplish and fine tune human attributes to live within our society. If this level is chosen, the child wants to learn and grow cognitively. This level embraces human characteristic and small achievements for when a child begins and matures into adulthood. When trying to be familiar to what a child feels comfortable with, first maybe a stick person, blank head . . . body . . . limbs, and later different size of bodies. This could also go for a Facial Features that could be enhanced for bringing attention to the feature. Another way to bring attention to human legs, one could add in other animal legs and let the child pick the one that looks similar to theirs.

Then an example to bring attention to a child's hand is to make a finger puppet page turner in the shape of a hand and between the fingers there could be a different type of dinosaur's tail or other types of animals or objects. For a pre-physical state a child could have a finger puppet in the shape of an infant that would be sitting up, rolling over, or crawling . . . next could be one walking, jumping, or dancing . . . and lastly, would be one that could run. Most like to run with their friends to the saying "One for the money, Two for the show, Three to get ready, and Four to go, go, go. At this level of human figures, like school kids that hold the seeds for the cognitive abilities beginnings such as alphabet, numbers, shapes, phonics etc. Next, they would work with words and spelling, short sentences and pictures, and saying pictures/words this would-be planting seeds for more complex abilities. Flip flop human figures could be used at this level also. An example, would the numbers 6 and 9. When Flip Flopped it is another number. An example of horizontal affect is as mentioned above where a baby can be the small in size and mature into an adult (larger size).

Level 5—Making Themselves as a "Look-a-Like" . . . Building Cognitive Abilities . . . . Sprouting of Cognitive and Physical Abilities Expanding on the hierarchy of needs, we discover the desire to explore and understand the unknown. Physically, children seek an answer to their curiosity by mimicking different animal actions, sounds, and facial expressions. This brings about their emotional awareness for equality. Their imagination draws them to desire acceptance in extended groups other than family, such as the neighborhood children and school mates. A child might pretend to be a Christmas tree to understand what it is like to be a triangle. In the same manner, a child would take a black marker and color his skin to try to understand what it is to live as a different color. A child might lick the hands of another acting like a puppy and decide not to become a puppy because it doesn't taste good. Children play dress-up and pretend to be people, like mom and dad, then on to other cultures, i.e., tea party, pop stars, superheroes. They are using their sense of sight in this action. The pre-physical of this level would be the sense of smell and taste, like the stench of pigs, or the tart smell of lemons, or the sweet aroma of flowers.

At this level, the child may be in a dreamy state by wanting to make themselves a "look-a-like." This would sprout their cognitive and physical abilities, which would lead them into creativity and wonderment. If this level was chosen, one would see the child's curiosity of the world around them that's within their grasps to build upon the future. This level is full of fun for a child. A hollow headed figure or object fits over top of the human or other figure and the rest of the body stuffed, then lays on the back of said figured. Some examples are the dino-, butter-, piggy-, horsy-back etc. this list could go on forever as some could have limbs and some may not, such as a snake. This is the level which a child builds more complex cognitive abilities. They begin to combine words with action. A child may ask a question of why does this dog have four legs and I only have two? An example of the horizontal affect at this level would be a baby dino-back on child figure and a full grow dino-back on the adult figure. This could work well as the flip flop finger puppets, also.

Level 6—Physical Development . . . . Finding Order and Beauty within and Around Abilities . . . . Building of Physical Abilities By gaining knowledge through mimicking, a child steps up to the aesthetic needs with the learning of symmetry, balance, order, and hygiene. Children learn balance through dance. Through tumbling, they learn symmetry. They learn hygiene through imitation and repetition. A child learns order through dressing, i.e., socks first, shoes second. A child gains balance by mimicking dances with dolls. Symmetry is mirroring the left side of the body to the right side. Most children by this age have developed fears from trial and error. At this stage, they are aware of body development (their arms and legs are longer and their heads and waists are larger). They acknowledge they are growing and not staying the same as an infant. They also associate animals and insects in the same manner, like a caterpillar turns into a butterfly and a pollywog turns into a frog.

They are becoming aware of their five senses. Their likes and dislikes to taste and smells, the differences between the touch sensation of smooth and rough, slimy (like a worm), and fluffy (like a caterpillar), and about light that is comfortable to eyes and the amount of sound to the ears. They are learning to compare and contrast. By comparing and contrast, they need to exert energy in order to have a physical balance. When this happens it helps the child's mental and emotional ability, along with their physical. At this level, the child sees his/her physical movements when using their muscles and tries to find order and beauty within and around those abilities. If this level is chosen, one could know that the child is discovering their physical abilities and possibly the physical abilities of other living things. Pockets could be applied to puppets to hold show muscles within the living. Their clothing inverted so children can see the difference of right-side-up and up-side-down. By placing the elastic band on the limbs children can begin to understand right from left, up from down, turning, straight from diagonal, bending, jumping, top from bottom, and back from front, and touching.

The process for doing fun exercises or a Wellness Program is flexibility, stretching, coordination and a systematic way to follow instructor with pocket puppet reading pals. Choose the exercise emotions (this is one large face and one small smiley face) then the pocket puppet reading pal, apply the exercise emotions to the puppet, choose exercise, perform the exercise, once the exercise is done, put the tape away, along with the exercise emotions and choose a reading book, and use the pocket puppet reading pal to flip the pages your reading. Instructor may give advise of the simple exercises in DVD form or CD form first then perform more complex ones as their progress improves. This advice would be called he horizontal affect.

Level 7—Higher Development . . . Actualization . . . Abilities To Grow and Share It is at this level that a child realizes that he/she is a whole person with feelings, emotions, needs, and desires. A child is at the beginning level to fulfill these needs on his/her own. Through past training, experimentation, and learning, the child has achieved this level. A child begins to desire self-achievement and acceptance separate from the family unit and begins to explore different areas to fulfill his/her needs and wants. This is the beginning when he/she realizes consequences and responsibility for his/her choices in life. The child's emotions now correspond with his/her physical reactions appropriately. If this level is chosen, the child is at a higher development. They begin actualization for himself/herself and others through empathy and morality to grow and share their world around them with skills learned from other levels. This level is the highest and most complex because one has combinations to choose from all levels and wants to share what was chosen. This level is a combination of all the levels. This is a higher development because of the complexity needed to think through and re-enact or be in creative talk about dual emotions. Flip flops could also be used at this level. They help a child's mind flow or concentrate.

These finger puppets are to be employed as a part of cognitive therapy representing a field of educational and medical therapy intended for the improvement of the mind response of the directed person. In the educational field, this is applied to children whose cognitive ability is apparently age neurodevelopmentally challenged, particularly with respect to social and emotional aspects. In the general medical situation, this applies to all ages of persons whose mind is culturally neurodevelopmentally challenged for some reason. One example of this is the puzzle emotional face, when given to construct, can ingratiate the sub-conscious mind into the conscious mind to mend to a healthy child. Another example of the mending is having broken bones, sore muscles, or a deficient organ and applying a smiley face to the hurt on the finger puppet.

A typical example for a versatile finger puppet is an oval shape colorful character that has a rubber material placed upon the belly and a holder given in different styles inside for placement of a finger into the puppet to help turn pages of a book. This character may or may not have extremities. A cognitive therapy patient that grabs the oval character and drags it across an open book results in turning the page.

In operation, the method comprises diagnosing and applying treatment for the emotional, physical and cognitive development of a child using a plurality of groups of indicia, including at least two symbols, or faces, all the symbols or faces of each group illustrate levels of need or emotions for a child by performing a number of steps. The main objective for this is to excite and motivate children about reading, but the second objective is a tool to diagnose abuse and other trauma or emotional issues. To diagnose, if a child's choices always are sub-sub due and sub-due are with emotion and geometric shape then they hold much fear. Build trust by communication and try to find the source of the fear. Keep things in the simple form. Treatment would be building trust, lessening the fear, know where they are by what they're choosing. Parent, guardian, educator, or psychologist knows that if the child feels it, then they will heal it. So, treatment will be left to their guidance with the use of the tools mentioned in this patent.

To diagnose a child, one must recognize a condition of outward signs. This could be a culture, social, context, temperament and the personality cognition, development, health, and biology according to the Cognitive Behavioral Play Therapy (CBPT) for the domains of an emotion. The recent development of CBPT reveals that cognitive strategies can be used effectively with young children if treatments are adapted in order to be developmentally sensitive and attuned to the child needs. So the treatment is in the form of the pyramid full of geometric shapes going from simplistic to complex starting at the bottom and going up vertically. Next are those geometric shapes within each level of said pyramid developed from simplistic to complexity (example of is a small triangle growing in full grown or a tadpole growing to an adult frog or a human baby growing to adulthood). The book of emotions also goes from simplistic to complex for each emotion. This addresses fear emotional, physical and intellectually.

These ways are a Kid Friendly® Technique to bring about the balance in a child's choices by maneuvering objects in front of them in order to come up with good cognitive strategies. Piaget's theory explains why he maneuvers objects in front of the child.

The practitioner who uses animal puppets with a child in an investigation of abuse does so partly at least because it will be less intimidating for a child to "talk" through animals—that is, the constraints involved in a direct verbal exchange are lifted, and the child can displace feelings and actions on to the puppet. Play is also a means of addressing the limitations imposed by the younger child's limited verbal capacity and cognitive awareness. Thus before a child has reached the stage of what Piaget describes as "formal operations" (ages 11 and up) and becomes capable of abstract thought, it may be easier to use physical representations of things which are familiar (a tree to represent the past history of a family, for example) than words. Thus the use of play is based on an understanding of it as an area free from constraints, and also on an assessment of the child's intellectual, emotional, and cognitive development. (Play Therapy A Non-directive Approach for Children and Adolescents, by: Kate Wilson, Paula Kendrick, Virginia Ryan 1992)

For this reason place the tools before the child to get them started. This includes the pyramid full of puppets (hand or finger), emotional book, regular book, specialty book, educational themes (tools), physical themes and music in some form. The child selects a hand/finger puppet or ball puppet of original design from the pyramid that interests the child. This could be of anything from 2-D to 3-D in design. Also, for gripping, the ball figured with large feet (for example, see drawings of duck) is used for the very young and the concept of the hand/finger puppets used as fingers are acknowledged. If they pick the 2-D it means that they hold some fear, which is the opposite of the 3-D designs. Also, what is important is to what degree that the child chooses as far as the sub-sub due, sub-due, normal, exaggerated, goofy, puzzled and mapped. The pyramid goes from Level #1 being to simplest vertically to Level #7 being most complex. If they pick the simplest it means that they don't want to deal with anything to complicate. If their choice is complex (Level #7) then they are ready to tackle anything that comes their way. There needs to be a look at it developmentally within each level also, because it also goes from simplistic to complex. If they choose a sub-sub due looking geometric shape, they really don't want choose anything because they fear everything. This could be in simplest form and body would be in a weakest state, example would be stick form and markings on face, like dots for eyes and a line in the shape of a smile. If sub-due geo-metric shape is chosen, the child's world is beginning to open up. Their life wants to be normal but a medium amount of fear stands in the way.

They watch the actions of others and say very little. As time goes on the normal geometric shape is yearned for. The fear has subsided. This normal is freedom. Freedom to feel emotionally free, freedom to act physically free and the freedom to be all that one can achieve is what feeling normal. Next, if the exaggerated geometric shape is chosen, the child feels left out much of the time and wants to be noticed. They feel as though they need to be noticed and by doing this they act out more. Much sadness is felt on this exaggerated shape. If goofy looking geometric shape is chosen, the child wants to feel happy, but really isn't. This feeling is a form of acting up in order to fit in with ones peers and sometimes choosing it to be different. They long for normalcy but know if they were normal they might loose the friends they have acquired by being goofy. A discussion of their choice can be approached, so as to or only to solidify their decision.

The child then selects an illustration from a first group, typically comprising faces having at least two symbols. The selection is based on the emotional level of the child and placed on the finger puppet. If they choose the simplest face then that means they are at their max in dealing with life and want to be withdrawn at this time till their inner self heals some. They may choose the sub-due, as their choice. And if this so they are trying to come out of their sadness and feel like taking a chance. If normal is chosen, then they are ok to tackle life itself. Now, if (delete-complex or -delete) exaggerated is chosen, then they are hiding anger or fear. Next, if goofy or wiggle or funny is chosen, they feel like being goofy or just want to have fun. A puzzled face is a face that is in pieces and physically takes one to put it together. This is intellectual. Next could be a mapped face, that would have a home or a favorite object that could be symbolizing security on one place of the face, then a connecting/dash/dotted line (this line could be made of objects-human or non-human) to another section of the face that could have a happy place that was enjoyed by child. This happy place could be a favorite fishing hole, a vacation place, a park, or just a happy location, event, and goal, to maybe something in the future that is desired. If they self select the mapped face, it would mean that the child would like to run away—if not physically then maybe mentally or may be looking for a happier place or time. A discussion of their choice can be approached, so as to or only to solidify their decision An illustration from a second group is selected and placed over the first illustration semi-covering the emotion described in the illustration. An example of this is a smile face added to the present emotion. The reason for this is to have a child walk away with a happy or positive feeling from first illustration. We want to continue to expanded the child's mind so more first illustrations (faces) maybe added with hook and loop or attachable system for storytelling ending up with the semi-covering positive illustration. For guidance, this step also could indicate the child has changed his original emotional status and maybe the result of a third party mentor talking to the child or performing an exercise to change the emotional status of the child.

Either illustrations or faces are removed from the finger puppet indicating the child has attained emotional stability. A way to make it more self gratifying is to have the child put away the illustrations on their own and praise them for achieving the completion. Above is focusing on the emotional activity and the physical activity and educationally activity are placed here before the reading. Physical activity is for being pro-active in a child's personal health, self esteem, coordination, and concentration with less fear.

The drawings are designed for the purpose of illustration only and not as a definition of the limits of the invention. (FIG. 1) is the front view of a pyramidal schematic of the hierarchy of children's needs. The first level is Geometric Shapes (FIG. 1-(A)), second level is a Structural Level (FIG. 1-(B)), third level is Movements of Animals (FIG. 1-(C)), fourth level is Human Accomplishments (FIG. 1-(D)), fifth level is making themselves as a "Look a Like" (FIG. 1-(E)), sixth level is Physical Development (FIG. 1-(F)), and seventh level is the Higher Development (FIG. 1-(G)). This pyramid can be adapted for computers.

(FIG. 2) shows the front views of a series of faces indicating degrees of growth of emotions starting with sub-sub-due (FIG. 2-(A)), sub-due (FIG. 2-(B)), normal (FIG. 2-(C)), exaggerated (FIG. 2-(D)), goofy or wiggly (FIG. 2-(E)), sub-due puzzled (FIG. 2-(F)), exaggerated puzzled (FIG. 2-(G)), and objects to goal working to normal (mapped) faces (FIG. 2-(H)) with a smaller smile face add-ability, plus a blank face (FIG. 2-(I)). These faces can be made to fit all races and be computerized. For advertisement these faces or a combination there of may be placed onto a page in order to capture a bigger audience.

(FIG. 3-(A) through (F)) shows examples of front view of attachments and additional functions of finger puppets in a physical form, plus a blank finger puppet. All have with rubbery bottoms. These may have 2-D or 3-D feeling faces applied (like illustrations in (FIG. 2 (A) through (I)) to their forehead with hook and loop material or other attachable type material. These can be made to fit all races and be computerized.

(FIG. 4-(A) through (C)) is the front view of examples of rubbery bottom geometric shapes—the triangle, square, circle with a sample of an attachable of a 2-D semi-side view of a feeling negative face with a front view of a small positive face to be attached for the geometric shape level 1 (FIG. 1-(A)) of the pyramid. All may have 2-D or 3-D feeling faces applied (like illustrations in (FIG. 2-(A) through (I)) to their forehead with hook and loop material or other attachable type material. These can be computerized. The faces can made to fit all races and be computerized.

(FIG. 5-(A)) shows a semi-side view of a geometric shaped finger puppet with hair and rubber heart shape on belly (FIG. 5-(B)) for the first level-Geometric Shape (FIG. 1-(A)) of the pyramid. This may have 2-D or 3-D feeling faces applied (like illustrations in (FIG. 2-(A) through (I)) to their forehead with hook and loop material or other attachable type material These can be computerized. The faces can made to fit all races and be computerized.

(FIG. 6-(A))]] shows a back and (FIG. 6-(B)) front view of a finger puppet with rubbery bottoms that functions as a bubble blower and (FIG. 6-(C)) a front view held by extremities for the first level-Geometric Shape (FIG. 1-(A)) of the pyramid. This may have 2-D or 3-D feeling faces applied (like illustrations in (FIG. 2-(A) through (I)) to their forehead with hook and loop material or other attachable type material. These can be computerized. The faces can made to fit all races and be computerized.

(FIG. 7-(A)) shows a side view of a representation illustrating a house of the structural form in the second level-Complex Structures (FIG. 1-(B)) of pyramid. This may have 2-D or 3-D feeling faces applied (like illustrations in (FIG. 2-(A) through (I)) to their front view with hook and loop material or other attachable type material. These can be computerized. The faces that could be placed on the houses can made to fit all races and be computerized.

(FIG. 8-(A)) this is a representation illustrating a dog's front view with a tongue made of rubber and (FIG. 8-(B)) a side view shown with an extremity for the third level—Movement of Animals (FIG. 1-(C)) of the pyramid. This may have 2-D or 3-D feeling faces applied (like illustrations in (FIG. 2-(A) through (I)) to their forehead with hook and loop material or other attachable type material. This may cover any type of animal from the past or present or future in 2-D or 3-D to be a book turner. These and be computerized.

(FIGS. 9-(A) and 9-(B)) shows a representation of two hand/finger puppets illustrating the front view of school children that can wear the emotional faces (like illustrations in (FIG. 2-(A) through (I)) attached by hook and loop material or other attachable material and have rubber on upper body made for the fourth level—Human Accomplishments (FIG. 1-(D)) of the pyramid. This can include all human past, present and future in 2-D or 3-D form. Also, these can have pockets that have anatomy cards for the medical field. The faces and clothing can made to fit all races and be computerized.

(FIG. 10-(A)) is the top view of a representation illustrating a snake with (FIG. 10-(B)) a material covered with stretchy material for the sixth level (FIG. 1-(F)) of the pyramid. This may have 2-D or 3-D feeling faces applied (like illustrations in (FIG. 2-(A) through (I)) to their forehead with hook and loop material or other attachable type material. These can be computerized.

(FIG. 11-(A)) is the front and back view of a hand/finger puppet of a representation illustrating a fan folded worm to show where (FIG. 11-(C)) hook and loop material may be placed on the tale, along with rubbery area that is on the back side of the worms head (FIG. 11-(B)). Next (FIG. 11-(E)) is a front view of a representation illustrating a fan folded hand/finger puppet character with stretchy arms and a loop attachment for hanging ability along with the possibility of swivels at both ends (FIG. 11-(D)) of character. The third (FIG. 11-(F)) is a front view of a hand/finger puppet of a representation illustrating a frog with stretchy arms and legs and a rubber belly. The fourth (FIG. 11-(G)) is a front view of a fury fan folded hand/finger puppet of a representation illustrating of a character with six stretchy arms and a rubbery face. The next (FIG. 11-(I)) is a front view of a hand/finger puppet of a representation illustrating a character with that has long hair and many stretchy arms and all of them made of a rubbery material. The last (FIG. 11-(H)) is a top view of a hand/finger puppet of a representation illustrating a spider that has eight stretchy legs with rubbery feet. All these have a purpose in the six level-Physical Development (FIG. 1-(F)) of the pyramid. All may also have 2-D or 3-D feeling faces applied (like illustrations in (FIG. 2-(A) through (I)) to their forehead with hook and loop material or other attachable type material. These can be computerized. These can be made into 2-D or 3-D form.

(FIG. 12-(A)) is a front view of a hand/finger puppet of a representation illustrating a character that holds two babies (FIG. 12-(B)) in the front. This is for the seventh level-Higher Development (FIG. 1-(G)) of the pyramid. All may have 2-D or 3-D feeling faces applied (like illustrations in (FIG. 2-(A) through (I)) to their forehead with hook and loop material or other attachable type material. This is made to get children to understand what it would be like to handle all plus two more sisters, brothers, or friends. What responsibility it would take to accomplish the tasks. These can be computerized. These may be made into 2-D or 3-D form.

(FIG. 13-(A)) is a front view of a hand/finger puppet of a representation illustrating a caterpillar that has a baby (FIG. 13-(B)) wrapping their stretchy arms around them like having a piggy back ride. This is for a seventh level-Higher Development (FIG. 1-(G)) of the pyramid. Both may have 2-D or 3-D feeling faces applied (like illustrations in (FIG. 2-(A) through (I)) to their forehead with hook and loop material or other attachable type material. These can be computerized. These may be made into 2-D or 3-D form.

(FIG. 14-(A)) is a side view of a representation illustrating a pig that is a puppet costume with a stretchy neck or possibly just under the chin that can be with or with out limbs. This character is called a piggy-back costume that fits over an object representing a figure in the level five-Making Themselves as a "Look-a-Like" (FIG. 1-(E)). A hook and loop or an attachable material can be applied for a 2-D or 3-D feeling face (like illustrations in (FIG. 2-(A) through (I)) placed on the forehead of costume. These can be computerized. These may be made into 2-D or 3-D form. These are all developed to enhance play and role play.

(FIG. 15-(A)) is a side view of a representation illustrating a horse that is a puppet costume with a stretchy neck that can be with or with out limbs. This character is called a horsy-back costume that fits over an object representing a figure in the level five—Making Themselves as a "Look-a-Like" (FIG. 1-(E)). A hook and loop or an attachable material can be applied for a 2-D or 3-D feeling face placed on the forehead of costume. These can be computerized. These may be made into 2-D or 3-D form.

(FIG. 16-(A)) is a side view of a representation illustrating a lady bug that is a puppet costume with a stretchy neck that can be with or with out limbs. This character is called a lady (bug) back costume that fits over an object representing a figure in the level five-Making Themselves as a "Look-a-Like" (FIG. 1-(E)). A hook and loop or an attachable material can be applied for a 2-D or 3-D feeling face placed on the forehead of costume. These can be computerized. These may be made into 2-D or 3-D form.

(FIG. 17-(A)) is a side view of a representation illustrating a dinosaur that is a puppet costume with a stretchy neck that can be with or with out limbs. This character is called a dino-back costume that fits over an object representing a figure in the level five—Making Themselves as a "Look-a-Like" (FIG. 1-(E)). A hook and loop or an attachable material can be applied for a 2-D or 3-D feeling face placed on the forehead of costume. These can be computerized. These may be made into 2-D or 3-D form.

(FIG. 18-(A)) is a side view of a representation illustrating a human-like character or an object representing a figure using other character-like costumes, and clothing in level 5-Making Themselves as a "Look-a-Like" (FIG. 1-(E)) of the pyramid. There are characters that fit in the pockets (FIG. 18-(B)) of clothing. Also, this can fit into Level six-Physical Development (FIG. 1-(F)) because the clothing can be inverted to help with individuals understanding how to do an exercise. A hook and loop or an attachable material can be applied for a 2-D or 3-D feeling face placed on the forehead. These can be computerized. These may be made into 2-D or 3-D form.

(FIG. 19-(A)) is the front view and (FIG. 19-(B)) side view of a representation illustrating a duck held by extremities to walk duck and to have duck's feet which are rubber stop and turn the page. The stop from walking button is on the back of character. A hook and loop or an attachable material can be applied for a 2-D or 3-D feeling face placed on the forehead. These can be computerized. These may be made into 2-D or 3-D form. This is made in a ball shape to give children who can't yet do the hand/finger puppets to grip this and still be a part of reading. This is why it is in the lower levels (FIG. 1-(A-E)).

(FIG. 20-(A)) this is a side view of another way two extremities can manipulate rubber feet to turn pages. A hook and loop or an attachable material can be applied for a 2-D or 3-D feeling face placed on the forehead.

(FIG. 21-(A)) this is a side view of a representation illustrating a fan-folded snake held (FIG. 21-(B)) by extremities or an extremity. There is a rubber area on the bottom of chin to turn a page. A hook and loop or an attachable material can be applied for a 2-D or 3-D feeling face placed on the forehead. These can be computerized. These may be made into 2-D or 3-D form.

(FIG. 22 (A) through (G)) shows cards held by the finger puppet that may contain shapes, faces, objects, letters, numbers or words phonics for cognitive therapy and their stackability. These can be computerized. These may be made into 2-D or 3-D form.

(FIG. 23-(A) through (V)) shows various embodiments of a finger puppet wherein the extremities represent multiple ways of facile manipulation. A hook and loop or an attachable material can be applied for a 2-D or 3-D feeling face placed on the forehead. These can be computerized. These may be made into 2-D or 3-D form. These can be computerized. These may be made into 2-D or 3-D form.

(FIG. 24-(A)) is the upside down view of finger puppet to show how stretchy material may be in to hold extremities. A hook and loop or an attachable material can be applied for a 2-D or 3-D feeling face placed on the forehead. These can be computerized. These may be made into 2-D or 3-D form.

(FIG. 25-(A)) is the cross section of a extremity and inside of puppet with filling material. These can be computerized. These may be made into 2-D or 3-D form.

(FIG. 26-(A)) is a upside down view of a hand/finger puppet that could have a finger holder (FIG. 26-(B)) for better movement or control of the turning of a page. A hook and loop or an attachable material can be applied for a 2-D or 3-D feeling face placed on the forehead. These can be computerized. These may be made into 2-D or 3-D form.

(FIG. 27-(A)) is the side view of a character for insertion electronic and non-electronic devices. A hook and loop or an attachable material can be applied for a 2-D or 3-D feeling face placed on the forehead. Rubber area with a pocket behind it is placed on character so pages can be turned. These can be computerized. These may be made into 2-D or 3-D form.

(FIG. 28-(A)) is a front view of a character with fiber optic possibilities. A hook and loop or an attachable material can be applied for a 2-D or 3-D feeling face placed on the forehead. Extremity pocket (FIG. 28-(B)) will be place according to rubber area that could be a facial feature[[(s)]] (FIG. 28-(C)), limb(s), and body for turning of pages. These can be computerized. These may be made into 2-D or 3-D form.

(FIG. 29-(B)) is a cross section and a side view of a character that has a vibration system within. Where if you pull a cord (FIG. 29-(C)) the subject will vibrate. This character will still have a rubber section applied (FIG. 29-(A)) with an extremity pocket behind it so pages can be turned. These can be computerized. These may be made into 2-D or 3-D form.

(FIG. 30-(A)) is a back view of a character with a clock chip or any kind of computer chip (like a GPS system) within. A hook and loop or an attachable material can be applied for a 2-D or 3-D feeling face placed on the forehead. Extremity pocket (FIG. 30-(B)) will be place according to rubber area that could be a facial feature(s), limb(s), and body for turning of pages. These can be computerized. These may be made into 2-D or 3-D form.

(FIG. 31(A)) is back view of a solar operated character. This solar may need to be curved in order to accommodate character. Extremity pocket (FIG. 31-(B)) will be place according to rubber area that could be a facial feature(s), limb(s), and body for turning of pages. A hook and loop or an attachable material can be applied for a 2-D or 3-D feeling face placed on the forehead. These can be computerized. These may be made into 2-D or 3-D form.

(FIG. 32-(B)) is a cross section of a battery pack and a front view (FIG. 32-(A)) of a character with indications of light eliminations. The battery pack may change in size to accommodate convenience. Extremity pocket will be place according to rubber area (FIG. 32-(C)) that could be a facial feature(s), limb(s), and body for turning of pages. A hook and loop or an attachable material can be applied for a 2-D or 3-D feeling face placed on the forehead. These can be computerized. These may be made into 2-D or 3-D form.

What is claimed is:
1. A personalized finger puppet for use in child cognitive therapy comprising:
at least one finger puppet base element that possess a geometric shape that corresponds to a discrete hierarchy of child cognitive development;

an external frictional surface on said finger puppet base element corresponding to the distal region of a child's finger to assist the child in turning the pages of a book;

an internal frictional surface on said finger puppet base element corresponding to the distal region of a child's finger to prevent the child's finger from slipping;

at least one pocket element on said finger puppet base element to secure at least one secondary personalized element;

at least one primary facial indicia;

at least one secondary facial indicia generally depicted as a happy face; and a plurality of interchangeable personalized appendages corresponding to a discrete hierarchy of child cognitive development through an attachment element.

2. A personalized finger puppet for use in child cognitive therapy as described in claim 1 wherein said frictional surface comprises a frictional surface selected from the group consisting of: a rubber patch element; a plurality of rubber strips; a gel pad; a magnet; a rough surface; a bubbled area; a singled bubbled protrusion; malleable plastic; a rubber element; and a gel pad.

3. A personalized finger puppet for use in child cognitive therapy as described in claim 1 and further comprising a plurality of independently movable feet elements having an external frictional surface to assist a child in turning the pages of a book through the independent movement of said feet elements.

4. A personalized finger puppet for use in child cognitive therapy as described in claim 1 wherein said secondary personalized element comprises a secondary personalized element selected from the group consisting of: 2-D animal form; 3-D animal form; 2-D human form; 3-D human form; 2-D human/animal hybrid form; 3-D human/animal hybrid form; a blanket; medical devices; internal organs; bones; letters; numbers; name indicia; address indicia; small sentence indicia; long sentence indicia; vowel indicia; consonants indicia; map indicia; pictures; phonics indicia; 2-D puzzles; 3-D puzzles; stackable cards; stackable faces; and indicia representing opposites.

5. A personalized finger puppet for use in child cognitive therapy as described in claim 1 wherein said hierarchy of child cognitive development comprises a seven (7) level hierarchy of child cognitive development.

6. A personalized finger puppet for use in child cognitive therapy as described in claim 1 wherein said finger puppet base element comprises a finger puppet base element selected from the group consisting of: a ball form; an animal form; a human form; a human/animal hybrid form; a bubble blower; a single finger form; a double finger form; a multiple finger form; a hand form; a double finger pincher form; a single finger form with an extended front portion to cover the top of a child's finger; and a flip-flop form with opposing finger positions on opposite sides of said finger puppet base element.

7. A personalized finger puppet for use in child cognitive therapy as described in claim 1 wherein said primary facial indicia comprises a primary facial indicia selected from the group consisting of: a sub-sub due facial indicia generally depicted as a small oval shaped emotionless face; a sub-due facial indicia generally depicted as a medium sized oval low-emotion face; a normal facial indicia generally depicted as a circular neutral emotion face; an exaggerated facial indicia generally depicted as a large circular face with exaggerated proportions; a goofy and/or wiggly facial indicia generally depicted as a irregular shaped face with exaggerated proportions; a puzzled facial indicia generally depicted as a circular face broken up into distinct pieces that can be connected together or disparately situated; a mapped indicia generally depicted as a circular element having an initial point familiar to a subject child and connecting element to a to a secondary goal and/or security image; and a blank indicia generally depicted as a circular element that can be filled in with personalized indicia by said subject child; a 2-dimensional facial indicia; and a 3-dimensional facial indicia.

8. A personalized finger puppet for use in child cognitive therapy as described in claim 1 wherein said a plurality of interchangeable personalized appendages comprises a plurality of interchangeable personalized appendages selected from the group consisting of: a 2-D appendage attachment; a 3-D appendage attachment; a fan-folding appendage attachment; a flexible appendage attachment; a card attachment; a plurality of interconnecting card attachments; a hair attachment; a bubble blower attachment; a jewelry attachment; a lighted visual attachment; an illumination attachment; a glow-in-the dark attachment; a lighted fiber optic attachment; a LED attachment; a vibration attachment; a battery attachment; a Velcro attachment; a solar power attachment; a drawing appendage attachment; an internal organ attachment; a spring attachment; a food attachment; a coil appendage attachment; an elastic appendage attachment; a swivel appendage attachment; at least one clothing attachment; at least one inverted clothing attachment; a gender attachment; a race attachment; at least one cultural identifier attachment; an edible attachment; at least one computer screen interface attachment; an audio attachment.

9. A personalized finger puppet for use in child cognitive therapy as described in claim 1 wherein said attachment element comprises an attachment element selected from the group consisting of: a loop attachment; a hook attachment; a hook and loop attachment; a tie attachment; a Velcro attachment; a swivel attachment, and a fitted attachment.

10. A personalized finger puppet for use in child cognitive therapy as described in claim 1 wherein said child cognitive therapy comprises a cognitive activity selected from the group consisting of: shape recognition; facial recognition; emotional recognition; letter recognition; number recognition; word recognition; relationship recognition; physical activity recognition; mimicking; anatomical recognition; opposite recognition; memory activity; color recognition, and awareness-of-self recognition.

11. A personalized finger puppet for use in child cognitive therapy as described in claim 1 and further comprising a personalizable costume comprising a hollow headed figure that is placed over the back of said finger puppet base element.

12. A personalized finger puppet for use in child cognitive therapy as described in claim 11 wherein said personalizable costume comprises a personalizable animal and/or human and/or a human/animal hybrid costume.

13. A personalized finger puppet page turner comprising:
a first two-dimensional textile body element connected along its outer-periphery to a second two-dimensional textile body element forming a 3-D finger puppet form with a cavity to accept child's finger;

an external frictional surface on said first two-dimensional textile body element corresponding to the distal region of a child's finger to assist the child in turning the page of a book;

an internal frictional surface on said first two-dimensional textile body element corresponding to the distal region of a child's finger to prevent the child's finger from slipping while turning the page of a book;

a personalized facial indicia attachable to said personalized finger puppet through a attachment element;

at least one interchangeable personalized appendage attachable to said personalized finger puppet element through a attachment element;

a personalizable costume comprising a hollow headed figure that is placed over the back of said finger puppet body;

a plurality of interchangeable personalized appendages attachable to said 3-D finger puppet body; and a plurality of interchangeable personalized clothing attachments that may be placed over to said 3-D finger puppet body.

14. A personalized finger puppet page turner as described in claim 13 wherein said frictional surface comprises a frictional surface selected from the group consisting of: a rubber patch element; a plurality of rubber strips; a gel pad; a magnet; a rough surface; a bubbled area; a singled bubbled protrusion; malleable plastic; a rubber element; and a gel pad.

15. A personalized finger puppet page turner as described in claim 13 wherein said personalized finger puppet is flip-flopped having two opposite and opposing cavities to accept a child's finger.

* * * * *